US011066000B2

(12) United States Patent
Woodrough, Jr.

(10) Patent No.: US 11,066,000 B2
(45) Date of Patent: Jul. 20, 2021

(54) SYSTEMS, METHODS, AND APPARATUSES FOR ENGAGING AND TRANSPORTING OBJECTS

(71) Applicant: United Parcel Service of America, Inc., Atlanta, GA (US)

(72) Inventor: Stephens B. Woodrough, Jr., Doraville, GA (US)

(73) Assignee: UNITED PARCEL SERVICE OF AMERICA, INC., Atlanta, GA (US)

( * ) Notice: Subject to any disclaimer, the term of this patent is extended or adjusted under 35 U.S.C. 154(b) by 284 days.

(21) Appl. No.: 16/102,060

(22) Filed: Aug. 13, 2018

(65) Prior Publication Data

US 2020/0047656 A1    Feb. 13, 2020

(51) Int. Cl.
*B60P 1/64* (2006.01)
*B62D 53/06* (2006.01)
*B60D 1/01* (2006.01)

(52) U.S. Cl.
CPC ............. *B60P 1/6427* (2013.01); *B60P 1/649* (2013.01); *B60P 1/6463* (2013.01); *B62D 53/06* (2013.01); *B60D 1/015* (2013.01)

(58) Field of Classification Search
CPC ......... B60D 1/015; B62D 53/06; B60P 1/649; B60P 1/6463; B60P 1/6427
See application file for complete search history.

(56) References Cited

U.S. PATENT DOCUMENTS

| 3,347,563 | A | 10/1967 | Harbers |
| 4,768,802 | A | 9/1988 | Winkler |
| 5,098,115 | A | 3/1992 | Haire et al. |
| 5,411,359 | A | 5/1995 | Kossila |

(Continued)

FOREIGN PATENT DOCUMENTS

| CA | 2932199 A1 | 12/2017 |
| EP | 2181915 A1 | 5/2010 |

(Continued)

OTHER PUBLICATIONS

Extended European Search Report received for European Patent Application No. 19190503.3, dated Jan. 3, 2020, 6 pages.

(Continued)

*Primary Examiner* — Saul Rodriguez
*Assistant Examiner* — Ashley K Romano
(74) *Attorney, Agent, or Firm* — Shook, Hardy & Bacon L.L.P.

(57) ABSTRACT

Systems, methods, and apparatuses for engaging, lifting, and moving objects such as wheeled cargo trailers are provided. In one embodiment, a mobile apparatus includes a transport mechanism, a frame, and one or more lift assemblies. The lift assemblies may be adjusted using one or more attached actuators that position the lift assemblies and/or components thereof for engaging and lifting an object. The transport mechanism may be autonomously operated. A vision system may be used to locate and identify objects and/or guide the mobile apparatus into position to engage and lift the objects. An adapter for a pneumatic braking system of a wheeled cargo trailer is also provided. The adapter provides a pneumatic attachment for a pressurized air source that is separate from a glad hands connector attached to the braking system.

10 Claims, 22 Drawing Sheets

(56) References Cited

U.S. PATENT DOCUMENTS

| | | |
|---|---|---|
| 7,149,611 B2 | 12/2006 | Beck et al. |
| 7,874,385 B2 | 1/2011 | Gavarini et al. |
| 7,878,750 B2 * | 2/2011 | Zhou ................... B25J 5/007 |
| | | 414/498 |
| 9,315,212 B1 | 4/2016 | Kyrtsos et al. |
| 9,371,133 B2 | 6/2016 | Mays |
| 10,322,874 B1 * | 6/2019 | Curley ................... B65F 3/00 |
| 2002/0146310 A1 * | 10/2002 | Chabanas ............. B60P 1/6463 |
| | | 414/498 |
| 2003/0077157 A1 * | 4/2003 | Smith ................... B60D 1/145 |
| | | 414/491 |
| 2003/0085562 A1 * | 5/2003 | Sparling ................ B60G 5/00 |
| | | 280/789 |
| 2007/0166139 A1 * | 7/2007 | Reed, III ................ B65F 3/02 |
| | | 414/491 |
| 2009/0155035 A1 | 6/2009 | Lundin |
| 2009/0250901 A1 | 10/2009 | Lundin |
| 2010/0135757 A1 | 6/2010 | Welch et al. |
| 2011/0074132 A1 | 3/2011 | Banwart |
| 2011/0107938 A1 | 5/2011 | Weidemann et al. |
| 2011/0175323 A1 | 7/2011 | Kimener |
| 2011/0318148 A1 * | 12/2011 | Obermeyer ........... B60P 1/6463 |
| | | 414/469 |
| 2013/0108402 A1 * | 5/2013 | Herman ................ B60P 1/6427 |
| | | 414/332 |
| 2013/0149087 A1 * | 6/2013 | Jones ................... B60P 1/6454 |
| | | 414/491 |
| 2014/0003895 A1 * | 1/2014 | Moller ................... B60L 53/80 |
| | | 414/462 |
| 2015/0132091 A1 * | 5/2015 | Obermeyer ........... B60P 1/6463 |
| | | 414/491 |
| 2015/0217609 A1 * | 8/2015 | Ellis ....................... B60D 1/58 |
| | | 280/477 |
| 2016/0068093 A1 * | 3/2016 | Kibler ................. B62D 53/061 |
| | | 280/423.1 |
| 2016/0200235 A1 | 7/2016 | Stigler et al. |
| 2016/0257237 A1 * | 9/2016 | Dagenais ............. B60P 1/6454 |
| 2017/0174422 A1 * | 6/2017 | Schomaker ........... B65D 90/18 |
| 2017/0361844 A1 | 12/2017 | Kahn et al. |
| 2020/0148469 A1 * | 5/2020 | Curley ................. B60P 1/6481 |

FOREIGN PATENT DOCUMENTS

| | | |
|---|---|---|
| GB | 2533140 A | 6/2016 |
| WO | 2007/141795 A1 | 12/2007 |
| WO | 2009/053524 A1 | 4/2009 |

OTHER PUBLICATIONS

Morris et al., "Self-Driving Aircraft Towing Vehicles: A Preliminary Report", Artificial Intelligence for Transportation: Advice, Interactivity and Actor Modeling: Papers from the 2015 AAAI Workshop, Jan. 2015, pp. 41-48.

Tsai et al., "Autonomous Vision-based Tethered-assisted Rover Docking", 2013 IEEE/RSJ International Conference on Intelligent Robots and Systems (IROS), Nov. 3-7, 2013, pp. 2834-2841.

Office Action received for Canadian Patent Application No. 3,050,068, dated Aug. 12, 2020, 4 pages.

* cited by examiner

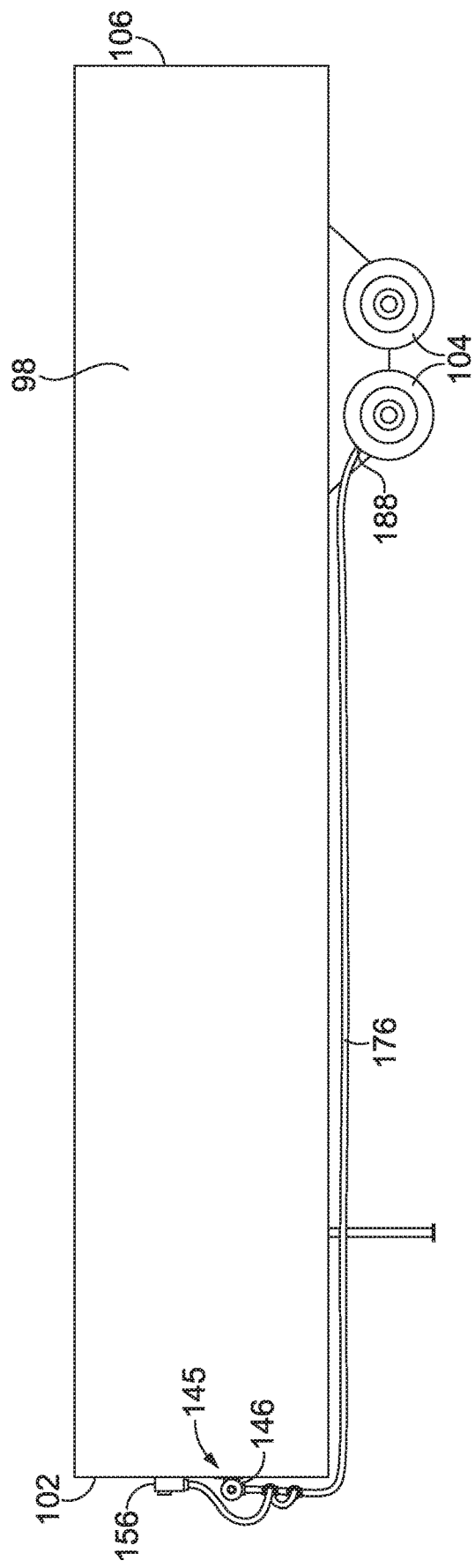

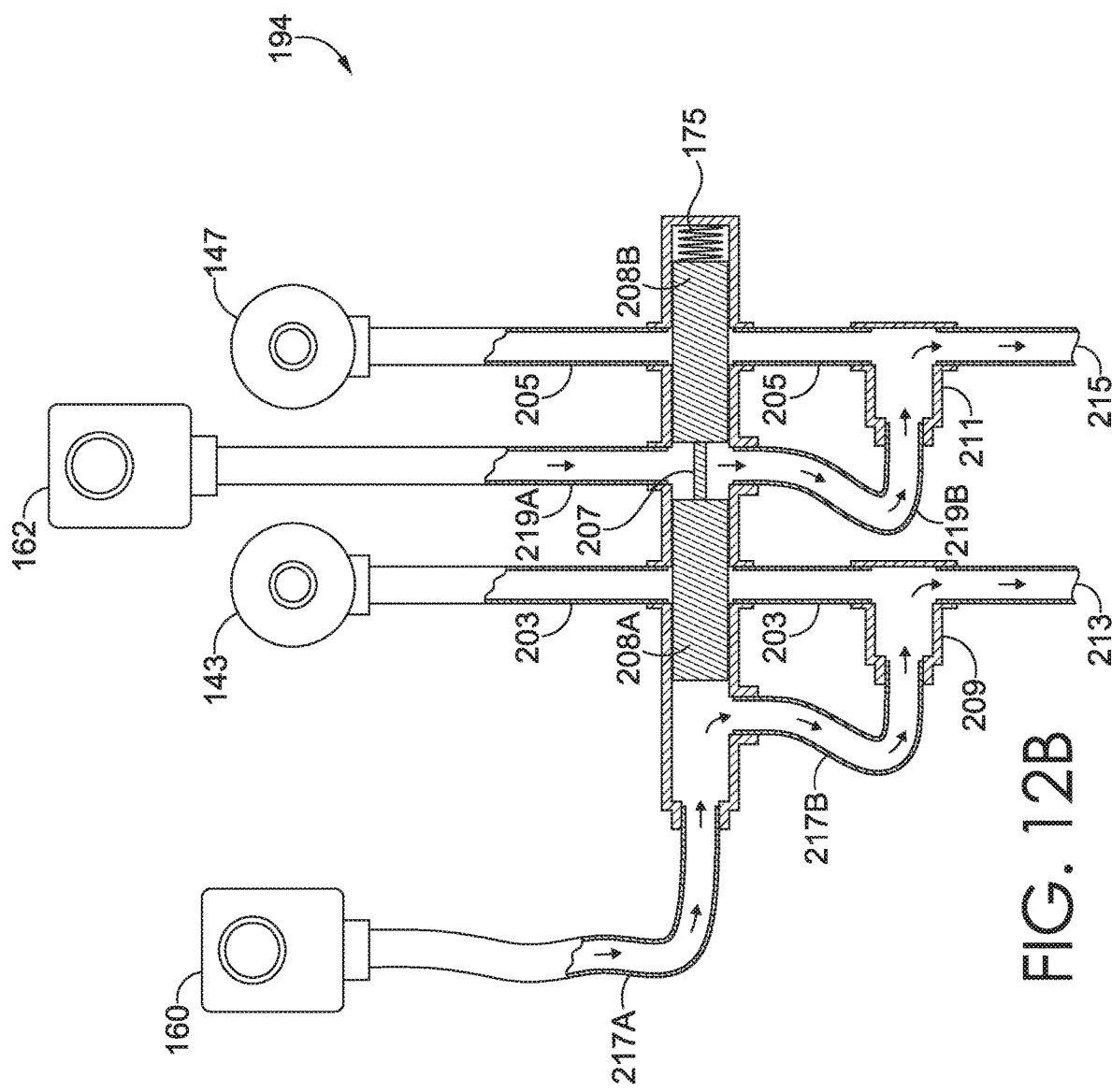

SYSTEMS, METHODS, AND APPARATUSES FOR ENGAGING AND TRANSPORTING OBJECTS

TECHNICAL FIELD

The field relates to systems, methods, and apparatuses for engaging and transporting objects, such as wheeled cargo trailers, or other wheeled or non-wheeled containers, vessels, and/or enclosures.

BACKGROUND

The transportation of objects, such as those that are not self-powered or independently mobile, presents a number of challenges. Locating the object, identifying the object, engaging the object, adjusting/positioning/lifting the object to enable a desired level of mobility, transporting the object, and monitoring/controlling the object's position, movement, and orientation are all significant challenges. Therefore, an apparatus that provides adaptable transportation capability for objects, such as, for example, wheeled cargo trailers, is needed.

SUMMARY

This summary is intended to introduce a selection of concepts in a simplified form that are further described below in the detailed description section of this disclosure. This summary is not intended to identify key or essential features of the claimed subject matter, and it is also not intended to be used as an aid in isolation to determine the scope of the claimed subject matter.

In brief, and at a high level, this disclosure describes, among other things, systems, methods, and apparatuses for engaging and moving objects. The object may be a wheeled cargo trailer or another type of wheeled or non-wheeled storage container/vessel/enclosure. The apparatus may be a mobile apparatus that is manually and/or autonomously controlled and operated. The apparatus may include a transport mechanism and a frame. In various embodiments, the frame may include a base portion, any number of elongated portions, and/or any number of structural elements, sections, and/or components, as well as functional apparatuses, that are arranged to at least partially enclose an object area. The apparatus may include one or more lift assemblies coupled to the frame that are operable to engage an object in the object area and lift it from a lowered position to a raised position to facilitate transporting the object.

The lift assemblies may have different configurations. For example, one lift assembly may include a movable fifth wheel. The fifth wheel may be coupled to an actuator operable to move the fifth wheel to different positions along a length of the frame. The fifth wheel may also be coupled to another actuator operable to raise and lower the fifth wheel, allowing it to engage and lift a kingpin on a wheeled cargo trailer. In another aspect, a lift assembly includes separate lift components positioned on opposite sides of the frame, the lift components coupled to one or more actuators that are operable to raise and lower the lift components, extend and retract the lift components, and/or otherwise adjust the position of the lift components on the frame to facilitate engaging and lifting an object. In a further aspect, a lift assembly may include one or more components adapted to engage and lift one or more wheels, tires, and/or axles or other drive train components located under an object such as a wheeled cargo trailer. In this sense, the components of the lift assembly may be adapted and/or positioned to lift certain structures and/or portions of an object. Also, by using a lift assembly with movable/adjustable lift components, a common apparatus can engage, lift, and move objects of different sizes, shapes, and/or configurations (e.g., wheeled cargo trailers of different lengths and/or having differently located lift points), providing adaptability and versatility for the moving of such objects.

The apparatus may also include a vision system that detects objects in the surrounding environment and/or that detects a position of an object being engaged, lifted, and moved by the apparatus. The apparatus may include position-tracking components that determine a location of the apparatus, including its position relative to other objects. The apparatus may include computer processors and hardware that are configured to identify, track, and/or log detected objects, and also provide proximity-oriented feedback to ensure adequate mobility of the apparatus without interfering with or contacting other objects. The apparatus may further include wireless communication components that are adapted to communicate information to a central server or another computing system separate from the apparatus.

In additional embodiments, a pneumatic adapter is provided that can be used to provide a pneumatic connection with a pneumatically-operated braking system of a wheeled cargo trailer or container. The pneumatic adapter may be used to provide a standardized pneumatic connection with the braking system, and/or to provide a pneumatic connection that is an alternative to a standard braking connection, such as a glad hands connection.

In another embodiment, a pneumatically-operated braking system for a wheeled cargo trailer is provided. The system includes, in one example aspect, a set of pneumatically-operated brakes, a glad hands connector, one or more pneumatic conduits, and the aforementioned adapter that provides a pneumatic connection with the pneumatic braking system, either through a glad hands connection or through a separate connection.

In another embodiment, a mobile apparatus for engaging and moving objects is provided. The mobile apparatus comprises a frame with a base portion, a first elongated portion extending from the base portion, and a second elongated portion extending from the base portion, the second elongated portion being spaced from the first elongated portion. The mobile apparatus further comprises a first lift assembly coupled to the frame, the first lift assembly having a first lifting component and a first actuator coupled to the first lifting component, the first actuator operable to move the first lifting component to different positions along a length of the frame, and a second actuator coupled to the first lifting component and operable to move the first lifting component between a raised position and a lowered position. The frame further comprises a second lift assembly comprising a second lifting component, a third actuator coupled to the first elongated portion and coupled to the second lifting component and operable to move the second lifting component between a raised position and a lowered position, a third lifting component, and a fourth actuator coupled to the second elongated portion and coupled to the third lifting component and operable to move the third lifting component between a raised position and a lowered position. The mobile apparatus further comprises a transport mechanism coupled to the frame (fixedly or detachably) that is operable to move the frame in at least one direction.

In another embodiment, a mobile apparatus for engaging and moving objects is provided. The apparatus comprises a frame comprising a base portion, a first elongated portion extending from the base portion, and a second elongated portion extending from the base portion, the second elongated portion spaced from the first elongated portion. The mobile apparatus further comprises a first lift assembly comprising a first forward lifting component coupled to a first lift actuator that is coupled to the first elongated portion, the first lift actuator operable to move the first forward lifting component between a raised position and a lowered position, and a second forward lifting component that is coupled to a second lift actuator that is coupled to the second elongated portion, the second lift actuator operable to move the second forward lifting component between a raised position and a lowered position. The frame further comprises a second lift assembly comprising a first rearward lifting component coupled to a third lift actuator that is coupled to the first elongated portion, the third lift actuator operable to move the first rearward lifting component between a raised position and a lowered position, and a second rearward lifting component coupled to a fourth lift actuator that is coupled to the second elongated portion, the fourth lift actuator operable to move the second rearward lifting component between a raised position and a lowered position. The mobile apparatus further includes a transport mechanism coupled to the frame (fixedly or detachably) that is adapted to move the frame in at least one direction.

In another embodiment, a pneumatically-operated braking system for a wheeled cargo trailer is provided. The system comprises a set of pneumatically-operated brakes coupled to a set of wheels of the wheeled cargo trailer, a glad hands connector coupled to the wheeled cargo trailer and pneumatically coupled to the set of pneumatically-operated brakes, the glad hands connector having a first pair of pneumatic couplings, a pair of pneumatic conduits extending between the set of pneumatically operated brakes and the glad hands connector, and an adapter coupled to the wheeled cargo trailer and operable to provide a pneumatic connection with the pneumatically operated braking system.

In another embodiment, a method for engaging and moving a wheeled cargo trailer using a mobile apparatus is provided. The method comprises moving the mobile apparatus to a first position. The mobile apparatus includes a transport mechanism, a frame comprising a base portion coupled to the transport mechanism, a first elongated portion extending from the base portion, a second elongated portion extending from the base portion such that the second elongated portion is spaced from the first elongated portion, a first lift assembly movably coupled to the frame, and a second lift assembly coupled to the frame. The first position comprises a position at which the frame at least partially surrounds/encloses the wheeled cargo trailer. The method further comprises moving the first and second lift assemblies into respective engaging positions, moving the first lift assembly from a lowered position to a raised position using a first actuator to lift a first end of the wheeled cargo trailer, moving the second lift assembly from a lowered position to a raised position to lift a second end of the wheeled cargo trailer, and moving the wheeled cargo trailer using the transport mechanism while the wheeled cargo trailer is lifted by the frame.

The term "object" as used herein should be interpreted broadly, to include any trailer, vehicle, container, vessel, enclosure, and/or other structure, including one of any size and shape, that can be engaged and lifted using the apparatuses and methods described herein.

BRIEF DESCRIPTION OF THE DRAWINGS

The subject matter disclosed herein that relates to systems, methods, and apparatuses for engaging and moving objects is described in detail with reference to the attached drawing figures, which are intended to illustrate non-limiting examples of the disclosed subject matter, in which like numerals represent like elements, wherein:

FIG. 11 depicts an example pneumatic braking system located on a wheeled cargo trailer that includes a glad hands connection and a pneumatic adapter, in accordance with an embodiment hereof;

FIG. 12B depicts the interlock shown in FIG. 12A in a second configuration, in accordance with an embodiment hereof;

DETAILED DESCRIPTION

Figure 1:
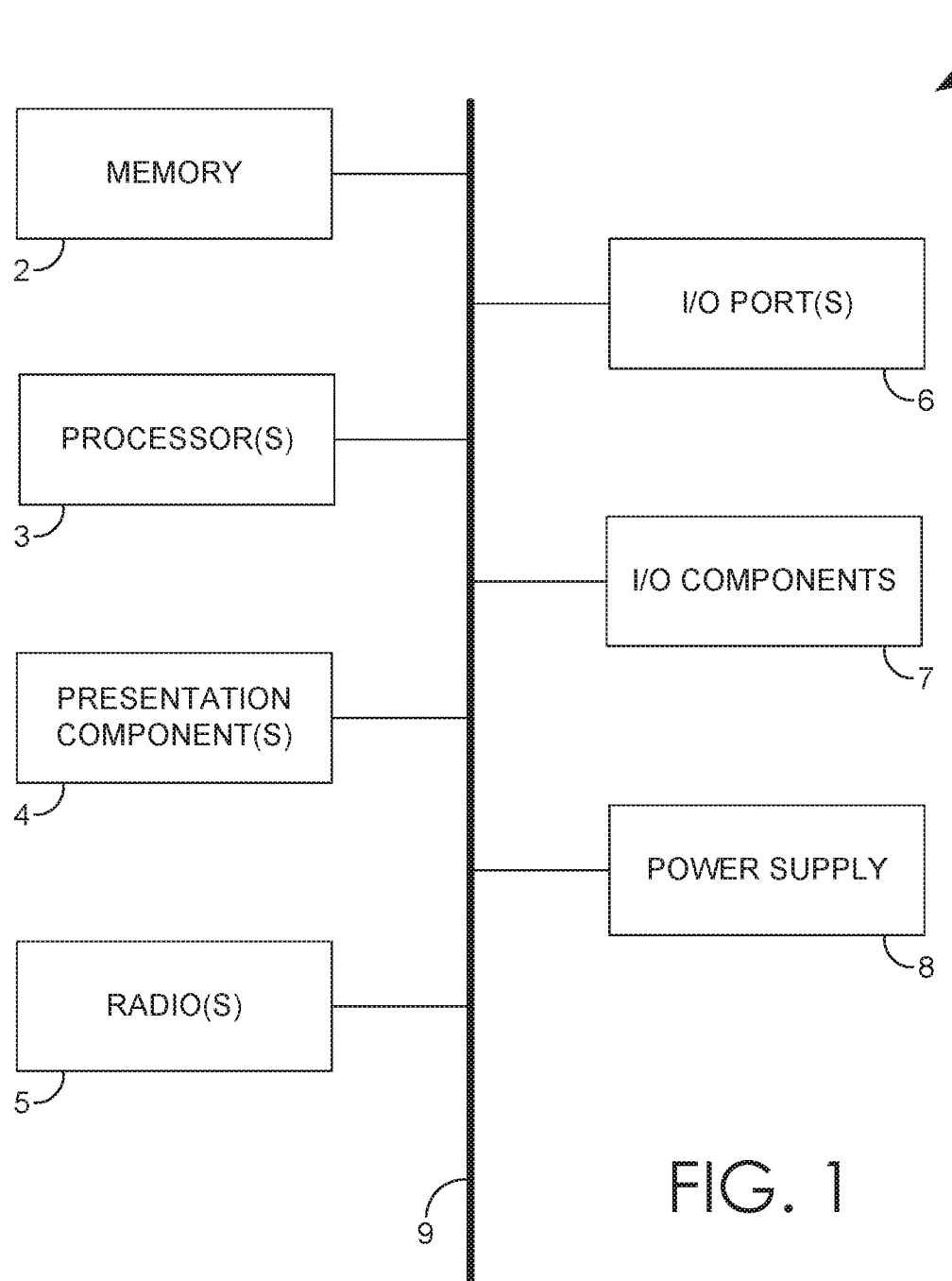
FIG. 1 depicts a block diagram of an exemplary computing system suitable for providing various functions in accordance with embodiments of the present disclosure.

The subject matter of this disclosure is described herein to meet statutory requirements. However, the description is not intended to limit the scope of the invention. Rather, the claimed subject matter may be embodied in other ways, to include different steps, combinations of steps, features, and/or combinations of features, similar to those described in this disclosure, and in conjunction with other present or future technologies. Moreover, although the terms "step" and/or "block" may be used herein to identify different elements of methods employed, the terms should not be interpreted as implying any particular order among or between various elements except when the order is explicitly described and required.

In general, at a high level, this disclosure describes systems, methods, and apparatuses for engaging, lifting, and/or moving objects, such as wheeled cargo trailers or other wheeled or non-wheeled containers/vessels/enclosures. The subsequent discussion will focus on aspects of the invention in the context of a wheeled cargo trailer. However, it should be understood that these aspects could also be implemented in the context of a non-wheeled container/vessel/enclosure, such as a shipping container. To provide one example, a wheeled cargo trailer is often positioned without an associated transport mechanism being attached, leaving the trailer with reduced mobility. Further, the wheels of the trailer may be coupled to a pneumatic braking system that remains locked until a pneumatic source is connected to the braking system. Embodiments hereof enable the engaging, lifting, and/or moving of objects, such as the aforementioned wheeled cargo trailers, using various engaging, lifting, and/or mobilizing systems and components. Embodiments hereof also allow for mobilizing objects, such as wheeled cargo trailers, using pneumatically operated systems and adapters. These embodiments are described in further detail below with reference to FIGS. 1-15.

The subject matter of this disclosure may be provided as, at least in part, a method, a system, and/or a computer-program product, among other things. Accordingly, certain aspects disclosed herein may take the form of hardware, or may be a combination of software and hardware. A computer-program that includes computer-useable instructions embodied on one or more computer-readable media may also be used. The subject matter hereof may further be implemented as hard-coded into the mechanical design of computing components and/or may be built into a system or apparatus for engaging and moving objects.

Computer-readable media may include volatile media, non-volatile media, removable media, and non-removable media, and may also include media readable by a database, a switch, and/or various other network devices. Network switches, routers, and related components are conventional in nature, as are methods of communicating with the same, and thus, further elaboration is not provided in this disclosure. By way of example, and not limitation, computer-readable media may comprise computer storage media and/or non-transitory communications media.

Computer storage media, or machine-readable media, may include media implemented in any method or technology for storing information. Examples of stored information include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided herein.

Referring now to FIG. 1, a block diagram of an example computing device 1 suitable for enabling functions described herein is provided, in accordance with an embodiment hereof. It should be noted that although some components depicted in FIG. 1 are shown in the singular, they may be plural, and the components may be connected in a different, including distributed, configuration. For example, computing device 1 might include multiple processors and/or multiple radios. As shown in FIG. 1, computing device 1 includes a bus 9 that may directly or indirectly connect different components together, including memory 2, processor(s) 3, presentation component(s) 4 (if applicable), radio (s) 5, input/output (I/O) port(s) 6, input/output (I/O) component(s) 7, and power supply 8.

Memory 2 may take the form of the memory components described herein. Thus, further elaboration will not be provided here, but memory 2 may include any type of tangible medium that is capable of storing information, such as a database. A database may include any collection of records, data, and/or other information. In one embodiment, memory 2 may include a set of computer-executable instructions that, when executed, facilitate various functions or steps associated with the subject matter described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that can present information through visual, auditory, and/or other tactile cues (e.g., a display, a screen, a lamp, a light-emitting diode (LED), a graphical user interface (GUI), and/or a lighted keyboard).

The radio 5 may facilitate communication with a network, and may additionally or alternatively facilitate other types of wireless communications, such as Wi-Fi, WiMAX, LTE, Bluetooth, and/or VoIP communications, among other communication protocols. In various aspects, the radio 5 may be configured to support multiple technologies, and/or multiple radios may be configured and utilized to support multiple technologies.

The input/output (I/O) ports 6 may take a variety of forms. Exemplary I/O ports may include a USB jack, a stereo jack, an infrared port, a firewire port, and/or other proprietary communications ports. The input/output (I/O) components 7 may comprise one or more keyboards, microphones, speakers, touchscreens, and/or any other item useable to directly or indirectly input data into the computing device 1. The power supply 8 may comprise batteries, generators, fuel cells, and/or any other component that may act as a power source to supply power to computing device 1 and to any other components described herein.

First Example of Mobile Apparatus for Engaging, Lifting, and Moving Objects

Figure 2A:
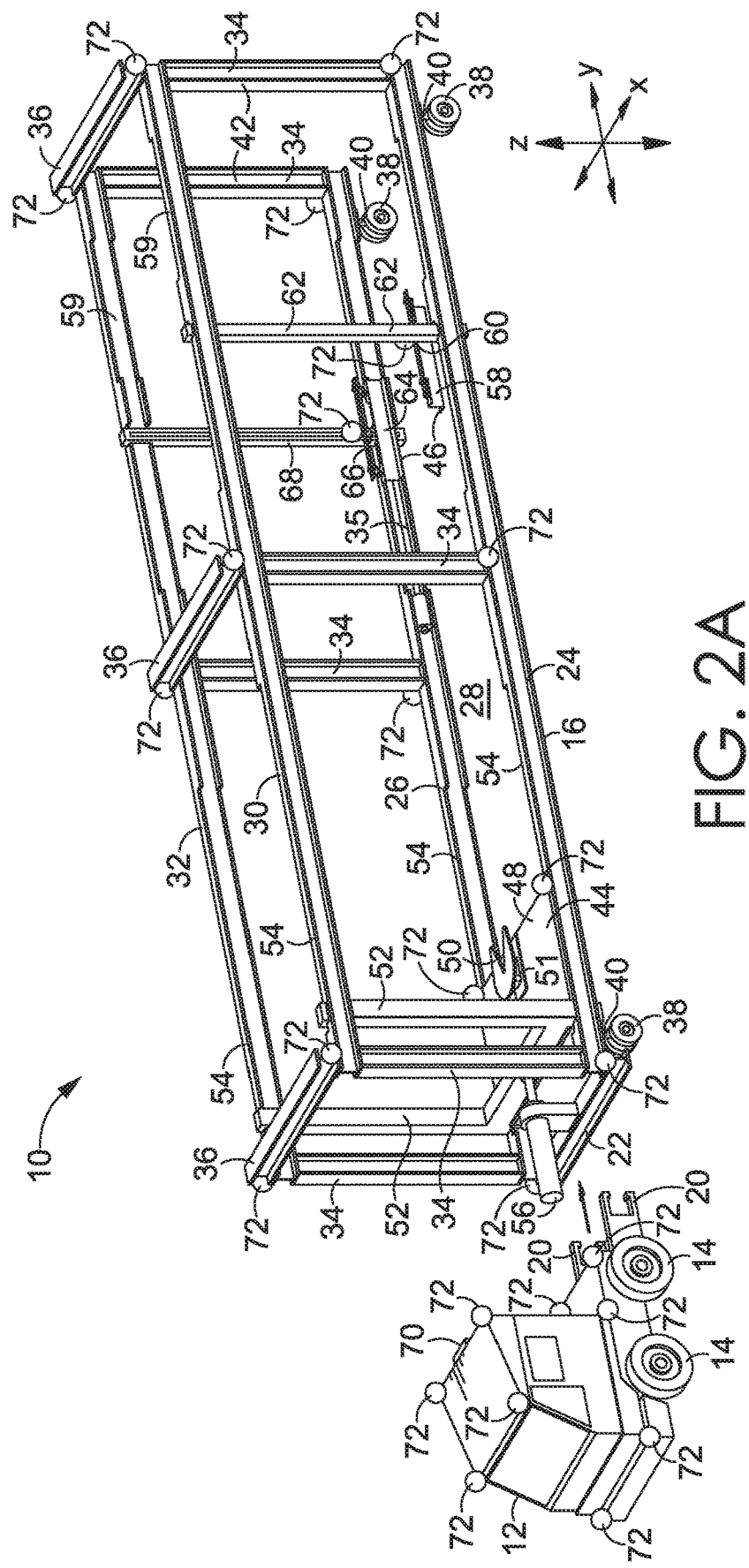
FIG. 2A depicts an example mobile apparatus adapted for engaging, lifting, and moving an object, such as a wheeled cargo trailer, in accordance with an embodiment hereof.

Referring now to FIG. 2A, a mobile apparatus 10 adapted for engaging, lifting, and moving objects, such as wheeled cargo trailers, is provided, in accordance with an embodiment hereof. The mobile apparatus 10 shown in FIG. 2A includes a transport mechanism 12. The transport mechanism 12 may take a variety of configurations between the different contemplated embodiments. For example, one contemplated transport mechanism is a vehicle having one or more propulsion mechanisms, such as electric motors and batteries and/or internal combustion engines and fuel cells, and a plurality of wheels that are connected to a drive system. The transport mechanism 12 may be manually operated, remotely operated, and/or autonomously operated, and/or may be sized, shaped, and/or configured to provide a desired amount of mobility or adaptability for engaging objects.

The example transport mechanism 12 shown in FIG. 2A includes a plurality of wheels 14. Some or all of the wheels 14 may be independently rotatable/steerable to provide a desired level of mobility for the mobile apparatus 10. For example, in contemplated aspects, any or all of the wheels may be adapted to rotate and/or be steered anywhere from +/−0-360 degrees (e.g., in non-limiting aspects, such wheels may be adapted to rotate and/or be steered +/−30 degrees, +/−60 degrees, +/−90 degrees, +/−180 degrees, or other amounts; other ranges are contemplated herein as well) to provide a desired level of maneuverability for the transport mechanism 12. In this regard, a greater amount of wheel rotation/steerability may be provided to support operation of the transport mechanism 12 in space-constrained areas, such as a storage depot where a plurality of wheeled cargo trailers are located in relatively close proximity.

The mobile apparatus 10 further includes a frame 16. As shown in FIG. 2A, the transport mechanism 12 includes a coupling mechanism 20 that is attachable to the frame 16. The coupling mechanism 20 may utilize pins, latches, male-female components, or other mechanical engagement elements that facilitate attachment of the transport mechanism 12 to the frame 16. The coupling mechanism 20 allows the transport mechanism 12 to be selectively attached to and detached from the frame 16. In other aspects, instead of being selectively attachable to the frame 16, the transport mechanism 12 may simply be fixedly, pivotally, or otherwise movably secured to the frame 16 without a releasable coupling.

The frame 16 further includes a base portion 22. The coupling mechanism 20 is configured such that it is attachable to the base portion 22. In other contemplated embodiments, additional structures and components may be utilized to attach the transport mechanism 12 to the frame 16. The frame 16 includes an elongated portion 24 that is coupled to and extends from the base portion 22 and an elongated portion 26 that is coupled to and extends from the base portion 22. The elongated portions 24, 26 are substantially parallel and spaced apart from each other, such that the base portion 22, the elongated portion 24, and the elongated portion 26 at least partially enclose an object space 28 in which an object that is to be engaged, lifted, and moved can be positioned (e.g., a wheeled cargo trailer).

The frame 16 further includes an elongated portion 30 coupled relative to the base portion 22 and relative to the elongated portion 24 such that it is spaced from the elongated portion 24. The frame 16 also includes an elongated portion 32 that is coupled relative to the base portion 22 and relative to the elongated portion 26 such that it is spaced from the elongated portion 26. The elongated portions 30, 32 are coupled to respective spacing members 34 and are spaced from the respective elongated portions 24, 26 by the spacing members 34. The elongated portions 30, 32 are also coupled to respective spacing members 36 and are spaced from each other by the spacing members 36. The elongated portions 24, 26, 30, 32 and the spacing members 34, 36 of the frame 16 collectively enclose and define, at least partially, the object space 28 within which an object can be positioned to be engaged, lifted, and moved. FIG. 2A, for example, illustrates the spacing members 34, 36 and elongated portions 24, 26, 30, 32 of the frame 16 as I-beams. However, these structural elements could have any type of cross-section (e.g., solid, hollow, round, square, rectangular, or triangular).

With further reference to FIG. 2A, the spacing members 34, 36 and elongated portions 24, 26, 30, 32 of the frame 16 collectively provide the structural strength and rigidity characteristics necessary for supporting a lifted object, such as a wheeled cargo trailer which may contain a cargo payload. Further, the frame 16 may be constructed of materials, and with design characteristics, that enable it to support a particular object (e.g., of a particular size, length, width, height, weight, etc.) or load. For example, the frame 16 may be sized and constructed so that it can lift and support a wheeled cargo trailer that is up to 30, 40, 50, or 60 feet long, up to 6, 8, or 10 feet wide, and/or up to 1, 2, 5, 10, 15, 20, 25, or 30 tons, for example, depending on the structural configuration. Design configurations that support other ranges are contemplated herein as well.

The frame 16 depicted in FIG. 2A further includes a plurality of wheels 38. The wheels 38 are pivotally coupled to the frame 16 at respective wheel attachments 40. As with the transport mechanism 12, any or all of the wheels 38 and wheel attachments 40 may be configured to provide a desired level of steering/rotation (e.g., each wheel 38 may be rotatable, or steerable, anywhere in the range of +/−0-360 degrees in various embodiments). Each wheel 38 may also be driven by a drive system. Each drive system may include a motor (e.g., an electric or internal combustion motor or a combination of the same), a steering mechanism (e.g., an electrically and/or hydraulically operated steering mechanism), and/or a power source (e.g., a generator, one or more batteries, or another power or fuel source). In contemplated aspects, some of the wheels 38 are fixedly attached to the frame 16 (i.e., not pivotal), and in other embodiments, only some of the wheels are driven by a drive system.

The multi-point maneuverability of the frame 16 provided by the steerable wheels 38 and the transport mechanism 12 allows for a desired level of mobility to be provided to the mobile apparatus 10 in the x and y directions (as indicated in FIG. 2A). The example mobile apparatus 10 shown in FIG. 2A includes four independently steerable wheels 38 pivotally attached to the frame 16 with respective wheel attachments 40. It is contemplated herein that with different embodiments of the mobile apparatus 10, more or fewer wheels 38 may be used. For example, to provide additional support, and/or increase load capacity of the frame 16, the frame 16 may include additional wheels, like the wheels 38 shown in FIG. 2A, coupled to the elongated portions 24, 26 of the frame 16 between the base portion 22 and an end 42 of the frame 16 that is opposite to the base portion 22.

Continuing with FIG. 2A, the mobile apparatus 10 includes a lift assembly 44 and a lift assembly 46 that are movably/adjustably coupled to the frame 16. The lift assemblies 44, 46 are each adapted to engage a portion of an object, such as a front portion and a rear portion of a wheeled cargo trailer, respectively, and then lift the portions of the object off of the ground, allowing the transport mechanism 12 and the frame 16 to collectively move the supported object to a desired location (e.g., without unlocking a pneumatic braking system when the object is a wheeled cargo trailer). The lift assemblies 44, 46 shown in FIG. 2A represent example embodiments. In other embodiments, additional, fewer, or differently configured lift assemblies and components thereof may be used to engage and lift different parts of an object (e.g., for heavier objects, more lift assemblies may be integrated into the mobile apparatus 10). Further, the depictions of the lift assemblies 44, 46 shown in FIG. 2A are provided in simplified form for clarity and explanation purposes, and in implementation, such lift assemblies may include additional components (e.g., hydraulic, mechanical, and/or electric actuator components, mechanical couplings, control components, cables, hoses, indicators, interfaces, etc.).

Referring still to FIG. 2A, the lift assembly 44 is movably coupled to the base portion 22 via an actuator 56. The actuator 56 may be a linear actuator (e.g., a hydraulic actuator, a screw-driven actuator, and/or a belt or chain-driven actuator) that is operable to move the lift assembly 44 to different locations along a length of the frame 16, or in other words, to different distances from the base portion 22. In this sense, the actuator 56 allows the lift assembly 44 to be positioned at a location that is suitable for engaging an object of a particular length that is located within the object space 28. Stated another way, the lift assembly 44 can be moved to different locations depending on the length of the object in the object space 28.

Figure 2B:
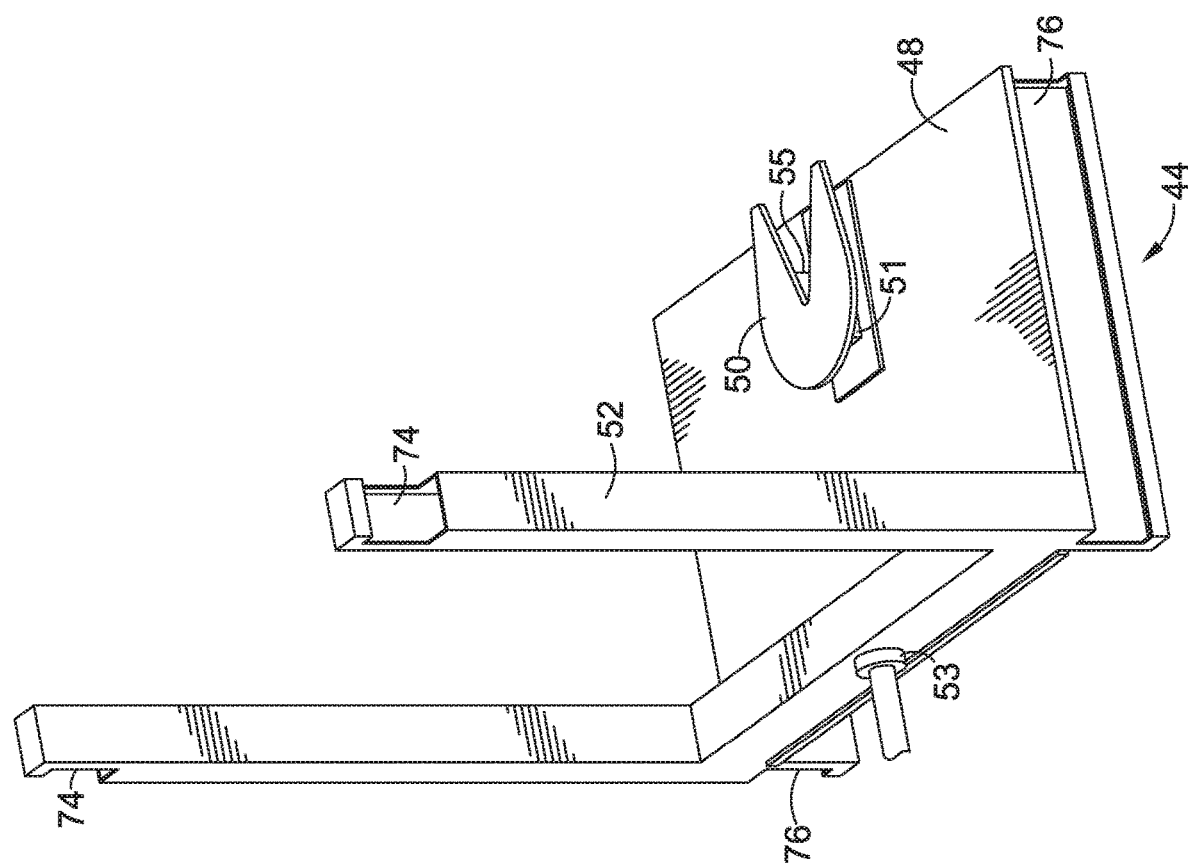
FIG. 2B depicts an example lift assembly used with the mobile apparatus depicted in FIG. 2A, shown in isolation, in accordance with an embodiment hereof.

Referring to FIG. 2A and also to FIG. 2B, the lift assembly 44 includes a base 48 and a lifting component 50 which is movably coupled to the base 48. The lifting component 50 is adjustable between a raised position and a lowered position using an actuator 51 coupled thereto (e.g., an electric or hydraulic linear actuator, which in FIGS. 2A and 2B is partially obscured under the base 48). For the embodiment shown in FIGS. 2A and 2B, the lifting component 50 is a fifth wheel adapted to engage and lift a kingpin located on a wheeled cargo trailer. It should be noted that other types of lifting components having different engaging structures may be used with the lift assembly 44 in other aspects.

The lift assembly 44 further includes a support frame 52 with a base 48 that is movably coupled to the elongated portions 24, 26 via a track 54 located thereon and to the elongated portions 30, 32 via a track 54 located thereon as well. The track 54 and base 48 may support the lifting component 50 and the support frame 52, slidably coupling them to the frame 16 and thereby allowing linear movement to be imparted to the lift assembly 44 by the actuator 56. In various embodiments, the base 48 may be supported by bearings, rails, rollers, and/or other components integrated with the elongated portions 24, 26, 30, and/or 32 that provide support and/or mobility for the lift assembly 44 mounted thereon. The configuration of the lift assembly 44 allows the lifting component 50 to be moved to different positions along the frame 16, allowing the lifting component 50 to engage and lift objects of different lengths. Further, additional actuators, guides, tracks, and/or support structures may be used with the frame 16 to support the movement of the lift assembly 44. In different embodiments, the mobile apparatus 10 and the frame 16 may include components that allow the lift assembly 44 to be locked into place at a desired location along a length of the frame 16. Such components may include locking pins, latches, and/or other mechanisms that are manually or mechanically/electrically actuated.

Continuing with FIG. 2A, the mobile apparatus 10 includes a lift assembly 46 positioned between the end 42 of the frame 16 and the lift assembly 44. The lift assembly 46 includes a lifting component 58 that is movably coupled to a support structure 62 coupled between the elongated portion 24 and the elongated portion 30. The lifting component 58 is movable between a raised position and a lowered position using an actuator 60 coupled to the lifting component 58 and to the elongated portion 24 and/or support structure 62. The actuator 60 is operable to move the lifting component 58 in the z-direction (as shown in FIG. 2A) to allow for raising and lowering a portion of an object that is engaged by the lifting component 58. The actuator 60, which is generally obscured in FIG. 2A, may be positioned at least partially within the elongated portion 24 and/or support structure 62 and/or below the lifting component 58, and may be a linear actuator. The actuator 60 allows the lifting component 58 to move in the z-direction, as shown in FIG. 2A, adjacent the support structure 62 that extends between the elongated portions 24 and 30.

The lift assembly 46 further includes a lifting component 64 that is movably coupled to a support structure 68 extending between the elongated portions 26, 32. The lifting component 64 is movable between a raised position and a lowered position using an actuator 66 coupled to the lifting component 64 and to the support structure 68 and/or second elongated portion 26. The actuator 66 is operable to move the lifting component 64 in the z-direction, as indicated in FIG. 2A, to allow for raising and lowering a portion of an object engaged by the lifting component 64. The actuator 66, similar to the actuator 60, may be positioned at least partially within the support structure 68 and/or the second elongated portion 26 and/or below the lifting component 64, and may be a linear actuator. The actuator 66 allows the lifting component 64 to move in the z-direction, as indicated in FIG. 2A, adjacent the support structure 68 extending between the elongated portions 26, 32.

The lifting component 58 and the lifting component 64 of the lift assembly 46 may each be movably coupled to the frame 16 in the y-direction on their respective sides of the frame 16. For example, the lifting component 58, the lift actuator 60, and the support structure 62 may all be movably coupled to the elongated portions 24, 30 via an actuator (not shown) coupled to the frame 16 (e.g., a linear actuator coupled along the elongated portion 24, which would be obscured in FIG. 2A). This allows a position of the components 58, 60, 62 along a length of the frame 16 in the y-direction, as indicated in FIG. 2A, to be adjusted. These components may move in unison in such actuated movement, sliding along the elongated portions 24, 30.

Similarly, the lifting component 64, the lift actuator 66, and the support structure 68 may all be movably coupled to the elongated portions 26, 32, such as via an actuator 35 coupled to the frame 16. It should be noted that an actuator (not shown) used for imparting movement of the lifting component 58, the lift actuator 60, and the support structure 62 in the y-direction, as indicated in FIG. 2A, that is mounted on the elongated portion 24 may be similar to the actuator 35 shown mounted on the elongated portion 26 in FIG. 2A. The actuator 35 is operable to adjust a position of the lifting component 64 in the y-direction, as indicated in FIG. 2A, along a length of the frame 16. Further, the support structures 62, 68 may be, as shown in FIG. 2A, movably coupled to and supported by a track 59 that is coupled to/part of the elongated portions 30, 32 of the frame 16. The respective actuators (e.g., 35 and/or other similar actuators) used to move the lifting components 58, 64, the lift actuators 60, 66, and the support structures 62, 68 in the y-direction, as indicated in FIG. 2A, may operate independently, or the actuation and movement may be coordinated such that it occurs in unison.

Accordingly, when an object, such as a wheeled cargo trailer, is received through the rear end 42 of the frame 16 into the object space 28, the lift assembly 44 can be repositioned at a location along the frame 16 in the y-direction that allows for engagement with and lifting of a first portion/end of the object. Additionally, in the case of the embodiment shown in FIG. 2A, the lift assembly 46, and particularly the lifting components 58, 64, can also be moved, such as via respective actuators, in the y-direction as indicated in FIG. 2A along the frame 16 to a desired location that allows for engaging and lifting a second portion/end of the object. These adjustments can be guided and/or facilitated using a computing system and/or vision system, as described in further detail below.

Each of the lifting components 58, 64 may further be extendably/retractably coupled to their respective support structures 62, 68 and/or elongated portions 24, 26, as shown in additional detail in the example aspects depicted in FIGS. 7A-7B and 8A-8B. In particular, each lifting component 58, 64 may be manually, or mechanically, extended and retracted via an actuator to allow the respective lifting component 58, 64 to be extended under or retracted from under an object (e.g., an underside of a wheeled cargo trailer). This allows the lifting components 58, 64 to be selectively moved into an engaging position where the lifting components 58, 64, when raised by the respective actuators 60, 66, engage and lift an object in the object space 28. Examples of extended and retracted positions for illustrative lifting components are shown in detail in FIGS. 7A-7B and 8A-8B.

The mobile apparatus 10 may include a vision system. The vision system may comprise a selection of components at distributed locations on the mobile apparatus 10. For example, one or more computer processors and/or hardware 70 may be located on the mobile apparatus 10 and communicatively connected (e.g., wirelessly and/or by wired connection) to a plurality of detectors 72 (e.g., sensors, cameras, etc., including any combination of the same) that are positioned about the mobile apparatus 10. The detectors 72 may be used to actively monitor the surrounding environment and/or object space 28. The detectors 72 may include range detection sensors, motion detection sensors, night vision sensors, thermal sensors, cameras, and/or other components that are configured to actively detect activity and/or environments around the mobile apparatus 10 or within the object space 28. The detectors 72 may be coupled to the transport mechanism 12 and/or to the frame 16 and may be used to guide the mobile apparatus 10 with increased precision (e.g., either manually or autonomously). Further, some of the detectors 72 may provide Light Detection and Ranging ("LIDAR") functionality that captures object distance and spacing data. Cameras (e.g., of image and/or video type) may be used to view and monitor conditions around the mobile apparatus 10, and record images/video of the same. It should be noted that the number, location, and orientation of the detectors 72 depicted on the example mobile apparatus 10 shown in FIG. 2A represents one aspect, and more or fewer detectors, with the same or different functionality, in the same or different locations, are possible and contemplated with aspects provided herein.

To provide an example of the operation of the vision system, in a circumstance where the mobile apparatus 10 is transporting a wheeled cargo trailer within a trailer storage depot, cameras and sensors mounted on the mobile apparatus 10 may detect objects, including the identity, position, orientation, and distance of the objects, within the depot so that the mobile apparatus 10 can navigate around them. This information may also be recorded and/or communicated to other computing devices to facilitate surveying/monitoring an area. For example, using object recognition, position-tracking, and data logging, an accounting of objects in a particular environment (e.g., a storage depot) may be performed. In some aspects, this information may be communicated to other computing devices, such as a central server, for logging and/or processing. The vision system may be configured to detect text and characters through optical character recognition ("OCR"). The vision system may also be configured to perform barcode scanning, RFID reading, shape recognition, and/or other types of recognition and/or identification of objects. This detected information can be stored, used by various processing components of the mobile apparatus 10 for guidance and steering purposes, and/or communicated to other computing devices for other purposes, in example aspects.

The computer processors and/or hardware 70 located on the mobile apparatus 10 may include components that provide wireless communication with other computing devices over a network. For example, components used to facilitate wireless communication may include Bluetooth, cellular, and/or satellite communication components, or components that provide communication over other wireless communication protocols as described herein. The wireless communication components may be configured to share information gathered by the mobile apparatus 10 with the other computing devices to facilitate improved information management.

The mobile apparatus 10 may also be configured with position-tracking components. For example, a Global Positioning System ("GPS") and components thereof and/or a Differential Global Positioning System ("DGPS") and components thereof may be incorporated into the mobile apparatus 10. The GPS or DGPS, or another tracking system in combination with the vision system, may be used to track the position of the mobile apparatus 10 and objects observed by the mobile apparatus 10 using the vision system. A position-tracking system used with the mobile apparatus 10 may communicate information about the location of the mobile apparatus 10 to other computer devices via the wireless communication components and the computer processors and/or hardware 70 described above. Although not shown, it is contemplated that components of the vision system and communication system may be positioned on an upwardly extending mast that may, in contemplated aspects, define a highest point of the transport mechanism 10. Of course, components of the vision system and communication system described herein may be positioned at any other location on the mobile apparatus 10 as desired.

The vision system may be outward-looking, detecting/monitoring an environment around the mobile apparatus 10 as well as objects and characteristics thereof, and may be inward-looking, detecting a position, orientation, and/or other characteristics of an object located in the object space 28 of the mobile apparatus 10 (e.g., that is being engaged and transported). For example, some of the detectors 72 on the mobile apparatus 10 (e.g., including sensors and/or cameras thereof), such as those shown positioned on the lift assembly 44 and the lift assembly 46 shown in FIG. 2A, may be oriented to face inward towards the object space 28, and therefore may be used to detect a position of an object therein. The information obtained by these vision system components may allow the mobile apparatus 10 to maintain proper spacing from an object, reducing the incidence of collision, or improper positioning.

For example, when the frame 16 is moved into position around a wheeled cargo trailer, the detectors 72 having inward facing components (e.g., cameras and/or sensors) may continuously provide feedback to the one or more computer processors and/or hardware 70 for guidance purposes. The one or more computer processors and/or hardware 70 can process this feedback and send instructions to various components of the mobile apparatus 10 (e.g., the transport mechanism 12, including the wheels 14 thereof, and the wheels 38 of the frame 16) to control the positioning of the mobile apparatus 10 around the wheeled cargo trailer. This combination of active feedback and control allows the frame 16 to be positioned with increased accuracy, particularly during autonomous operation of the mobile apparatus 10.

Referring to FIG. 2B, the lift assembly 44 of the mobile apparatus 10 depicted in FIG. 2A is provided in isolation, in accordance with an embodiment hereof. As described with respect to FIG. 2A, the lift assembly 44 includes the base 48, the lifting component 50, which in the aspect depicted in FIG. 2B is a movable fifth wheel useable for engaging a kingpin located on a wheeled cargo trailer, and the support frame 52. The support frame 52, as discussed with respect to FIG. 2A, can be movably coupled to the frame 16.

The lift assembly 44 further includes a mount 53. The mount 53 is used for attaching the actuator 56 (shown in FIG. 2A but not in FIG. 2B) to the lift assembly 44. The actuator 56, as shown in FIG. 2A, is attached to the base portion 22 at one of its ends and is attached to the lift assembly 44 via the mount 53 at the other of its ends, as shown in FIG. 2B. This attachment between the base portion 22 and the lift assembly 44 allows the actuator 56 to impart movement to the lift assembly 44 so that the lift assembly 44 can be repositioned along the frame 16. It should be noted that additional or alternative actuators and assemblies may be used to move the lift assembly 44 along the frame 16, and the lift assembly 44 and actuator 56 shown in FIGS. 2A-2B represent only one illustrative embodiment.

With continued reference to FIG. 2B, the lifting component 50 is coupled to the actuator 51, which is partially obscured by the lifting component 50 and the base 48. The actuator 51 is operable to move the lifting component 50 between a raised position and a lowered position, which allows the lifting component 50 to raise and lower a portion of an object. In the example embodiment depicted in FIG. 2B, the lifting component 50 is a movable fifth wheel with a kingpin engaging slot 55 that is adapted to be moved into position to engage a kingpin located on a wheeled cargo trailer. The actuator 51, which may be a linear actuator that extends and retracts to raise and lower the lifting component 50, is located below the fifth wheel. The support frame 52 at least partially supports the lift assembly 44 and an object lifted by the same. The support frame 52 includes track-engaging portions 74, 76 that are shaped, sized, and adapted to engage and move along the tracks 54 located on the frame 16 of the mobile apparatus 10 shown in FIG. 2A. In this sense, the track-engaging portions 74, 76 movably attach the lift assembly 44 to the frame 16.

Figure 3:
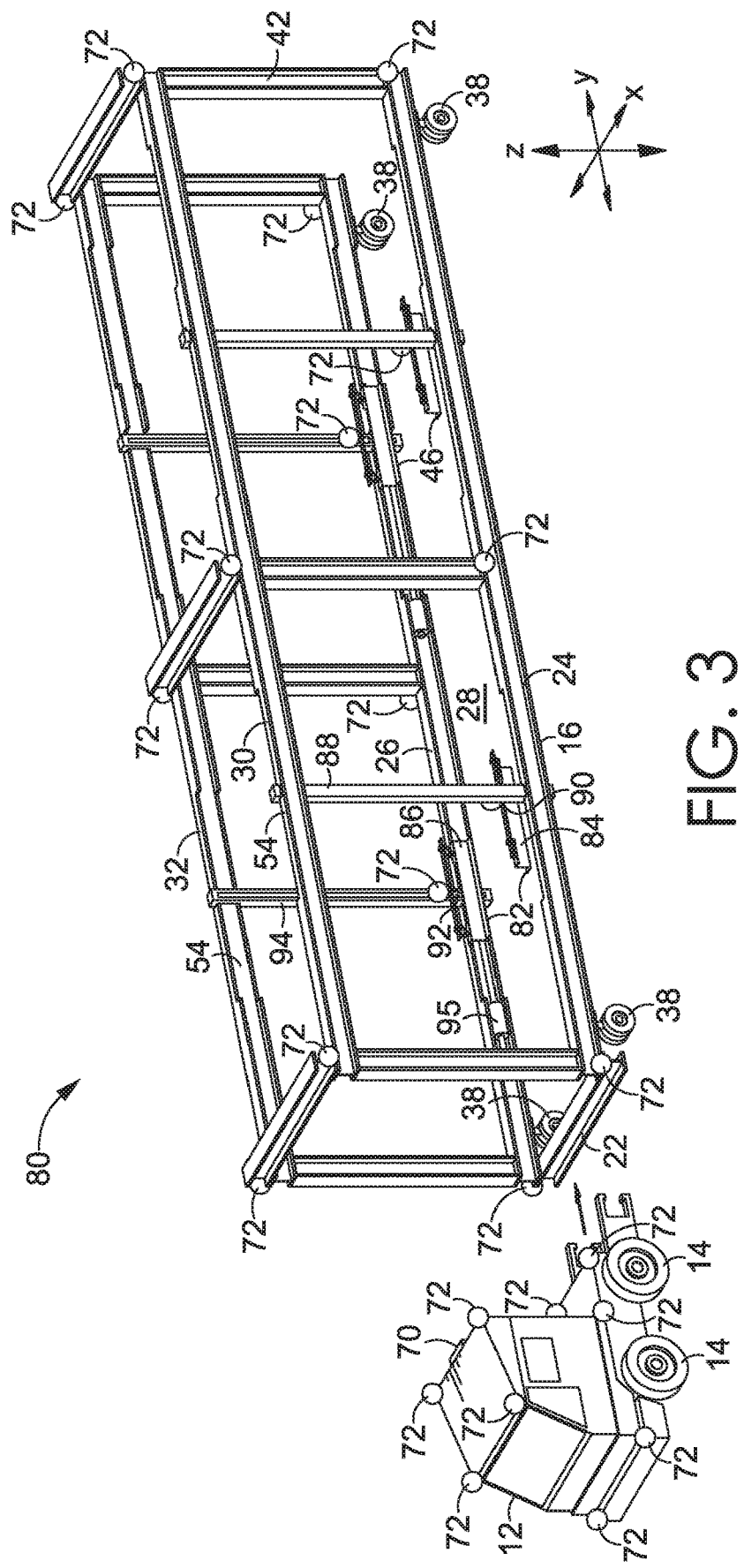
FIG. 3 depicts another example mobile apparatus adapted for engaging, lifting, and moving an object, in accordance with an embodiment hereof.

Second Example of Mobile Apparatus for Engaging, Lifting, and Moving Objects FIG. 3 depicts an alternative mobile apparatus 80 adapted for engaging, lifting, and moving objects, where the mobile apparatus 80 has a different configuration of lift assemblies than the mobile apparatus 10 depicted in FIG. 2A, in accordance with an embodiment hereof. The mobile apparatus 80 shown in FIG. 3 includes, like the mobile apparatus 10 of FIG. 2A, a transport mechanism 12, a frame 16, and a vision system comprising computer processors and/or hardware 70 communicatively coupled to a plurality of detectors 72 (e.g., sensors and cameras), among other common components. The mobile apparatus 80 is also similar to the mobile apparatus 10 shown in FIG. 2A in that it includes the lift assembly 46 proximate the end of the frame 16 opposite to the base portion 22. However, the mobile apparatus 80 shown in FIG. 3 includes a different lift assembly 82 than the lift assembly 44 shown in FIG. 2A. The lift assembly 82 shown in FIG. 3 is similar to the lift assembly 46 located proximate the end of the frame 16 opposite to the base portion 22. In other words, instead of providing a single lifting component 50 (e.g., a fifth wheel) with the lift assembly 44, the lift assembly 82 provides separate lifting components 84, 86 that are attached to the elongated portions 24, 26 of the frame 16, respectively, similar to the lift assembly 46.

Continuing with FIG. 3, the lifting component 84 is movably coupled to a support structure 88 such that it is movable relative to the support structure 88 in the z-direction, as indicated in FIG. 3. The support structure 88 is movably coupled to the elongated portion 24 such that it is movable relative to the elongated portion 24 in the y-direction, as indicated in FIG. 3. Further, the lifting component 84 is coupled to an actuator 90 that is operable to raise and lower the lifting component 84 relative to the support structure 88 (i.e., moving the lifting component 84 in the z-direction as indicated in FIG. 3). The lifting component 84, the support structure 88, and the actuator 90 are also movably coupled to the elongated portions 24, 30 in the y-direction, as indicated in FIG. 3. In the example aspect shown in FIG. 3, the support structure 88 is movably coupled to the track 54, which is located on both elongated portions 24, 30. This allows the support structure 88, as well as the lifting component 84 and the actuator 90 coupled thereto, to move along a length of the frame 16 in the y-direction as indicated in FIG. 3 to a suitable location for lifting an object. The lifting component 84, the support structure 88, and the actuator 90 may be moved in the y-direction using an actuator coupled thereto (e.g., a linear actuator, such as a hydraulic, electric, or screw-driven linear actuator) that is coupled to the elongated portion 24 and actuatable in the y-direction, as indicated in FIG. 3.

Looking now to the opposite side of the frame 16, the lifting component 86 is shown. The lifting component 86 is coupled to a support structure 94, which is movably coupled to the elongated portions 26, 32 of the frame 16. The lifting component 86 is also coupled to an actuator 92 that is operable to raise and lower the lifting component 86 in the z-direction, as indicated in FIG. 3. Like the arrangement on the opposite side of the frame 16, the actuator 92 is coupled to the support structure 94 such that it is movable with the support structure 94 in the y-direction, as indicated in FIG. 3. In this sense, for the aspect shown in FIG. 3, the lifting component 86, the actuator 92, and the support structure 94 are movable together along the frame 16 in the y-direction, like the components 84, 88, 90 mounted on the opposite side. This movement of the lifting component 86, the actuator 92, and the support structure 94 in the y-direction may be imparted by an actuator 95 which is coupled to the elongated portion 26. A similar actuator and coupling assembly may be provided for the lifting component 84, the support structure 88, and the actuator 90 on the opposite side of the frame 16, in order to support imparting a similar movement to those components. Overall, the configuration of the lift assembly 82 shown in FIG. 3 provides different support for an object as compared to the lift assembly 44 shown in FIG. 2A (e.g., by providing support on both sides of the object).

Like the mobile apparatus 10, the operation of the lift assembly 82 shown in FIG. 3 may be manual or may be automated and/or may be guided by a vision system. It should be noted that additional lift assemblies, possibly similar to the lift assemblies 82, 46 shown in FIG. 3, may be utilized in other embodiments, and different configurations of the lift assemblies 82, 46 are contemplated herein as well.

Example Process for Engaging, Lifting, and Moving an Object

Figure 4A:
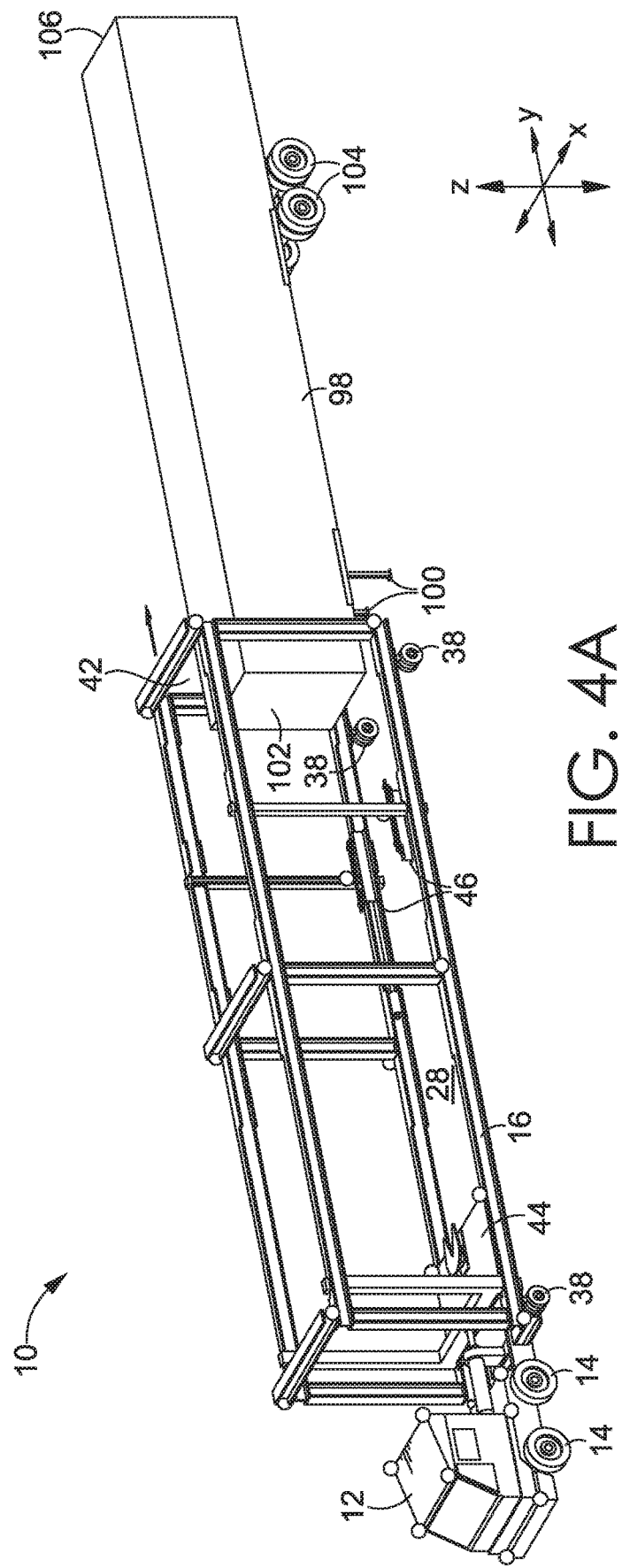
FIG. 4A depicts the mobile apparatus of FIG. 2A moving into position around a wheeled cargo trailer, in accordance with an embodiment hereof.
Figure 4B:
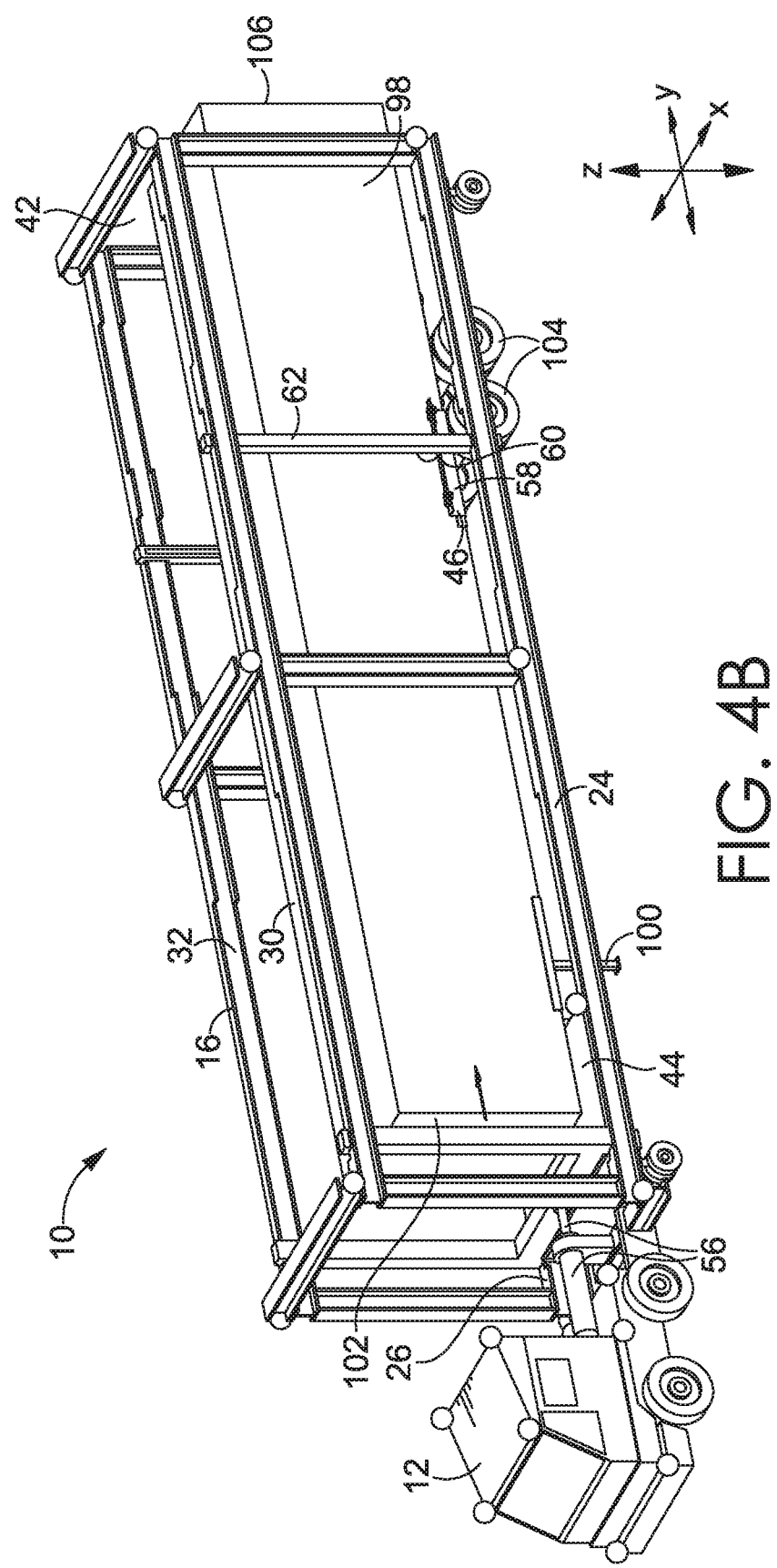
FIG. 4B depicts the mobile apparatus of FIG. 4A engaging the wheeled cargo trailer, in accordance with an embodiment hereof.
Figure 4C:
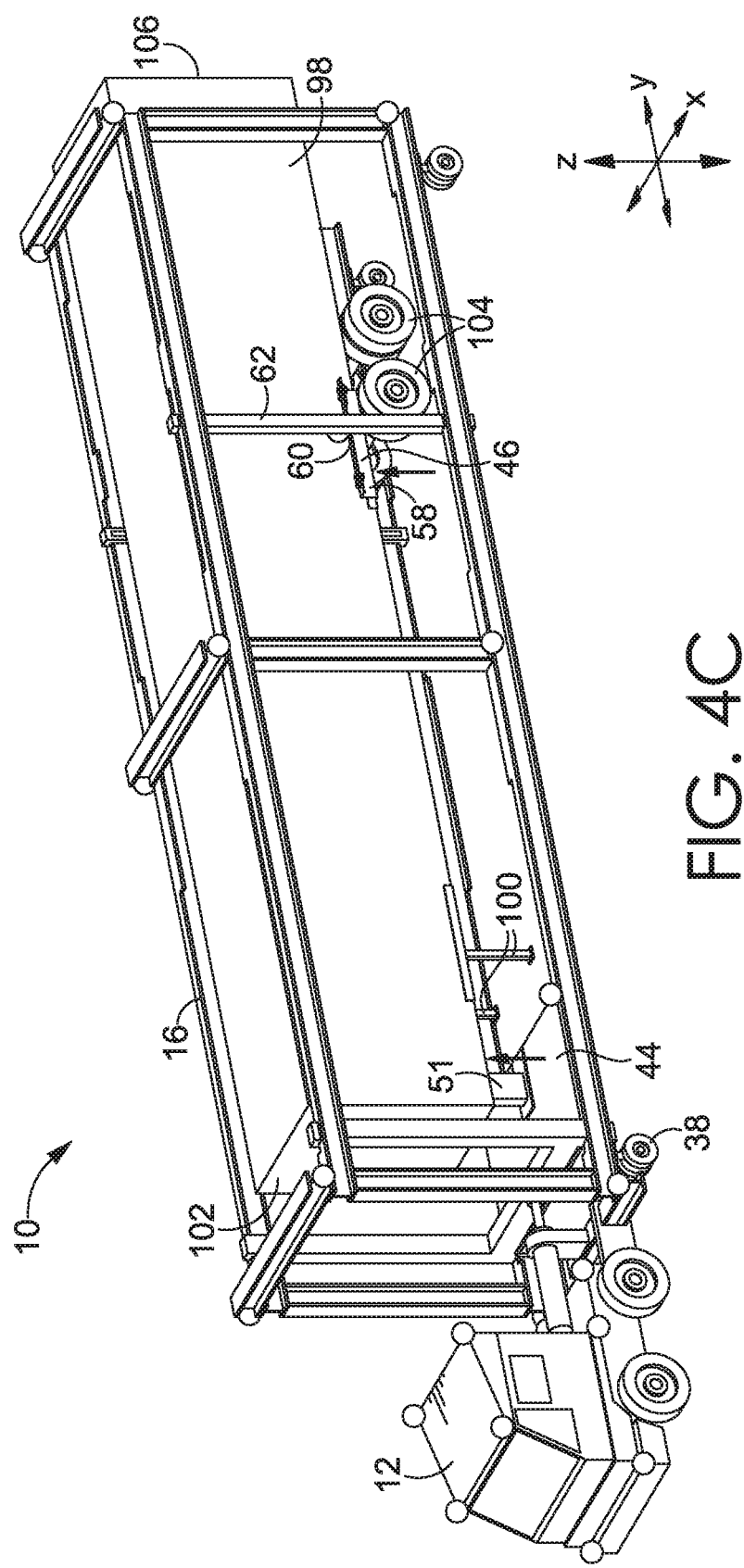
FIG. 4C depicts the mobile apparatus of FIGS. 4A-4B lifting the wheeled cargo trailer, in accordance with an embodiment hereof.

FIGS. 4A-4C depict the mobile apparatus 10 shown in FIG. 2A enclosing, engaging, and lifting an object, in accordance with an embodiment hereof. The object, in this example, is a wheeled cargo trailer 98; however, in alternative aspects, the object may be a different type of object, such as, for example, a wheel-less cargo container, vessel, and/or enclosure. In FIG. 4A, the mobile apparatus 10 is moved into position around the trailer 98. The trailer 98 includes landing gear 100 located proximate a first end 102 of the trailer 98. The landing gear 100 is resting on the ground in FIG. 4A, supporting a forward portion of the trailer 98. The trailer 98 also includes a set of wheels 104 located proximate a second, rearward end 106 of the trailer 98. The trailer 98 may include a pneumatic braking system which, without a pneumatic connection, is engaged to prevent or restrict rotation of the wheels 104. FIG. 4A shows the trailer 98 remaining stationary while the frame 16 is moved into position around the trailer 98. The mobile apparatus 10 may utilize the vision system described herein to support automated, manual, or a combination of automated and manual steering and positioning.

Turning to FIG. 4B, the trailer 98 is shown at least partially enclosed by the frame 16 and in a position in which it is ready to be lifted by the frame 16. In certain aspects, using the vision system described herein, characteristics of the object (e.g., size, contents, location, equipment designation, etc.) such as, for example, the trailer 98 shown in FIG. 4B, may be determined at least partially through detection of an identifier located on the object. Such an identifier may be one or more numbers and/or characters that are located and visible on the object. The object characteristics may be used to determine how the object should be positioned within the object space 28 enclosed by the frame 16. The object characteristics may also be used to determine the positions the lift components should be located in order to properly engage and lift the object.

In certain aspects, when the frame 16 is positioned around the object, the frame 16 may be positioned such that an end of the object extends past an end of the frame 16. This may be done to allow for increased access to the end of the object. For example, where the object is the trailer 98 shown in FIG. 4B and the trailer includes rear doors that can be opened and closed (see e.g., FIGS. 6B and 14 for one such aspect), the positioning of the end of the trailer past the end of the frame 16 may support increased range of motion of the doors of the trailer 98. Further, this positioning of the frame 16 relative to the trailer 98 also allows the end of the trailer 98 that extends past the frame 16 to be positioned at a desired location, such as adjacent a loading dock.

With continued reference to FIG. 4B, the lift assembly 44 is moved towards the rear end 42 of the frame 16 using the actuator 56 so that the lifting component 50 is located at a position at which the actuator 51 can elevate it to engage and lift the front end 102 of the trailer 98 (e.g., by engaging and lifting a kingpin located on an underside of the trailer 98).

Similarly, the lift assembly 46, part of which is obscured in FIG. 4B, can be adjusted into an extended position where the lifting components 58, 64 (not shown) are extended towards each other and under the trailer 98. Then, the lifting components 58, 64 can be raised in the z-direction as indicated in FIG. 4B using the actuators 60, 66 (shown in FIG. 2A) to lift the rear end 106 of the trailer 98 (as shown in FIG. 4C). The lifting components 58, 64 may also be moved along the respective elongated portions 24, 26 in the y-direction as indicated in FIG. 4B using respectively coupled actuators (e.g., such as the actuator 35 shown in FIG. 2A). This repositioning in the y-direction may allow the lifting components 58, 64 to be positioned at a correct location for engaging an underside of the trailer 98 (e.g., a location that will not interfere with components of the trailer 98, such as lights, reflectors, hoses, etc., or a location that aligns with a designated "lift point" on the trailer 98). This positioning may also be guided by the vision system.

Turning to FIG. 4C, the lifting component 50 of the lift assembly 44 and the lifting component 58 of the lift assembly 46 (and also the lifting component 64 of the lift assembly 46 shown in FIG. 2A, which is obscured in FIG. 4C) are elevated by their respective actuators 51, 60, 66, moving the trailer 98 in the z-direction as indicated in FIG. 4C to lift the landing gear 100 and the rear wheels 104 of the trailer 98 off of the ground. In this circumstance, even with the pneumatic brakes of the rear wheels 104 of the trailer 98 locked, the lifting of the front and rear ends 102, 106 of the trailer 98 off of the ground allows the trailer 98 to be moved using the transport mechanism 12 and the frame 16 without interference from the brakes. In other words, the wheels 104 do not need to be able to roll on the ground in this lifted transport position. Once the trailer 98 is suspended as shown in FIG. 4C, the transport mechanism 12 and the frame 16 can be used to guide the trailer 98 to a desired location, moving it in one or more directions during the process. Further, locating the trailer 98, engaging the trailer 98, lifting the trailer 98, and/or moving/steering the trailer 98 may be guided, informed, and/or controlled using the vision system described herein.

It is contemplated herein that for mobile apparatuses having multiple lift assemblies (e.g., forward and rearward lift assemblies, lift assemblies on opposite sides of a frame, etc.), the lift assemblies may be lifted/actuated in unison or may be lifted/actuated independently using their respective actuators. These lift assemblies may also lift an object at independent rates until a threshold weight, determined by a weight sensor, is detected by each lift assembly, at which time the lift assemblies may lift the object at the same rate.

It is also contemplated herein that an object, such as a wheeled cargo trailer, may be lifted to different contemplated heights to allow for a desired freedom of movement. For example, a wheeled cargo trailer, such as the trailer 98 shown in FIGS. 4A-4C, may be lifted by a mobile apparatus anywhere from 1-12 inches off of the ground to provide a desired freedom of movement. Other lifted distances are also contemplated for the embodiments described herein.

Additional Example Process for Engaging, Lifting, and Moving an Object

Figure 5A:
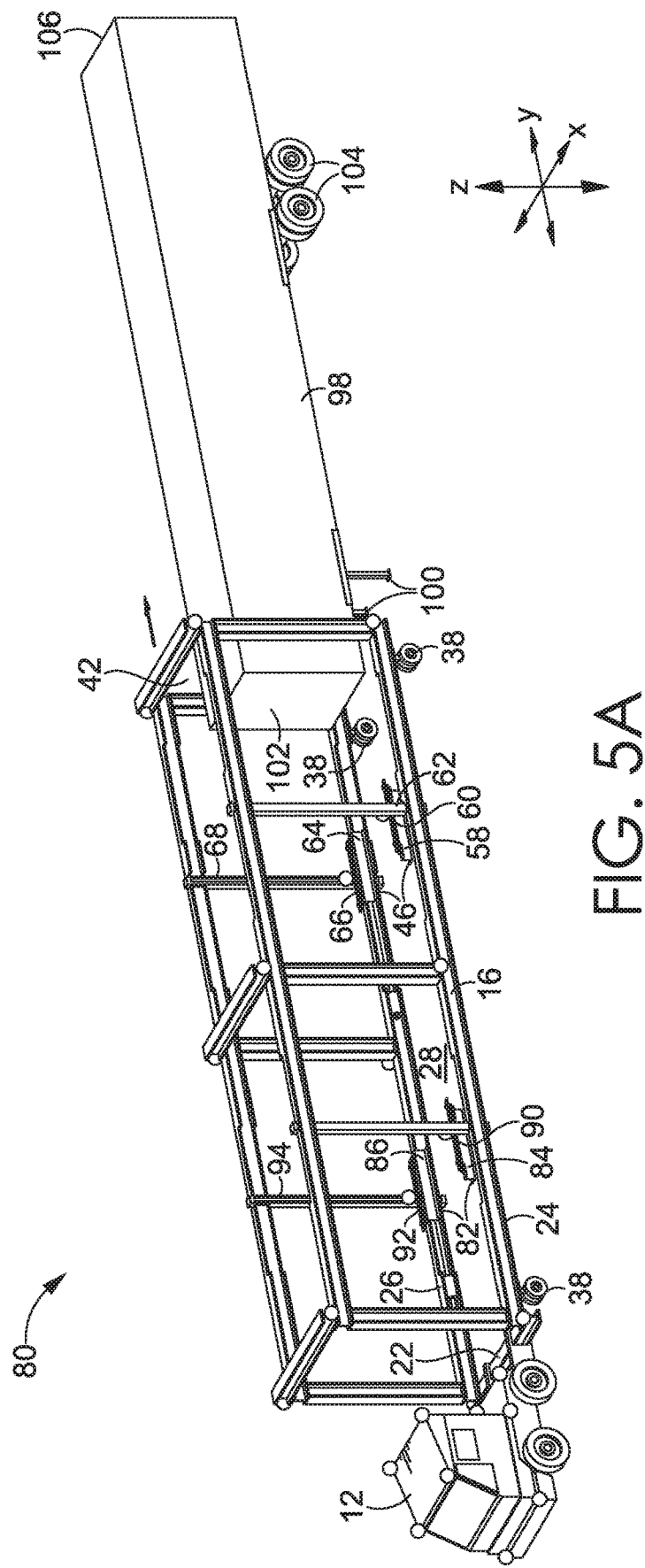
FIG. 5A depicts the mobile apparatus of FIG. 3 moving into position around a wheeled cargo trailer, in accordance with an embodiment hereof.
Figure 5B:
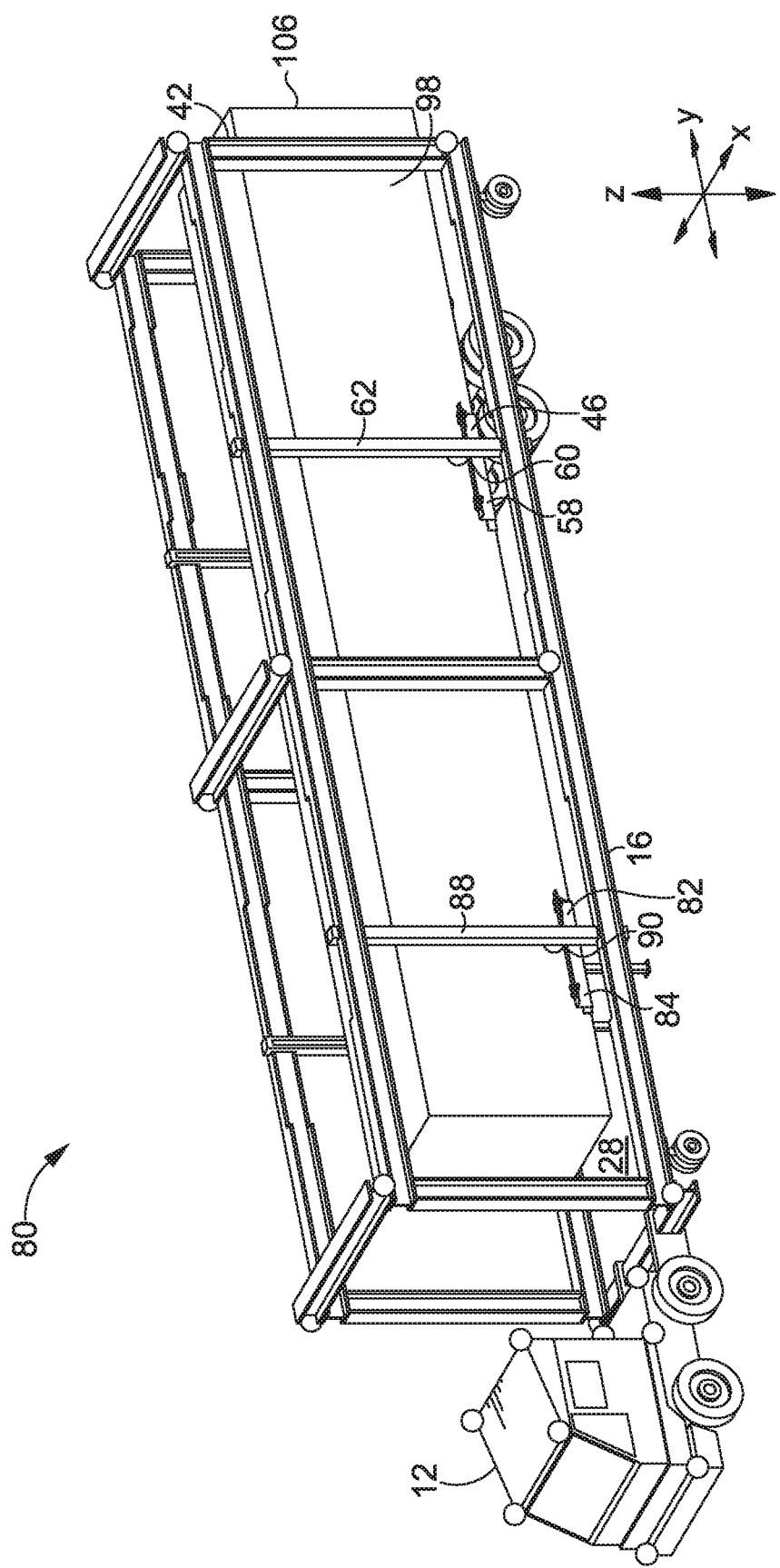
FIG. 5B depicts the mobile apparatus of FIG. 5A engaging the wheeled cargo trailer, in accordance with an embodiment hereof.
Figure 5C:
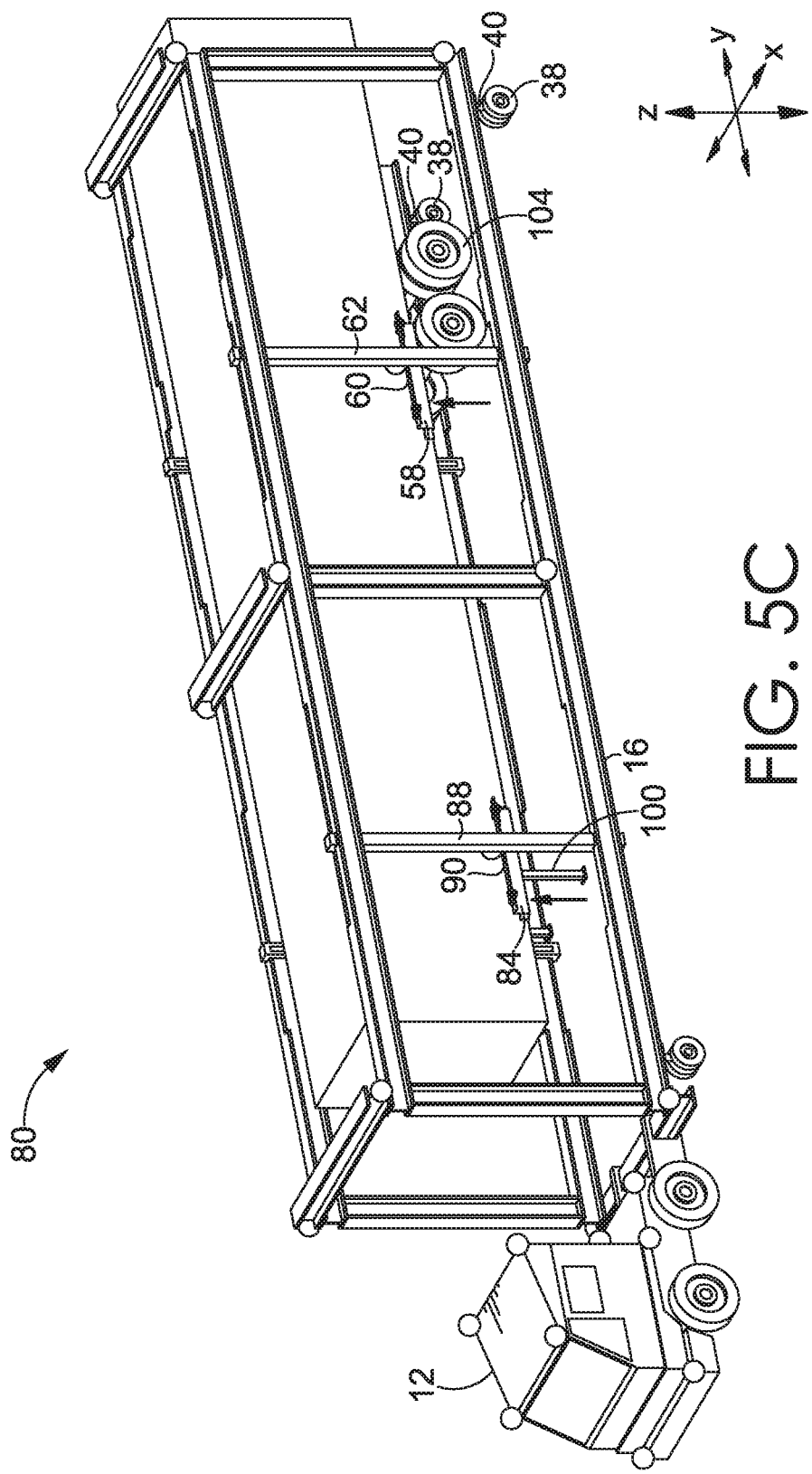
FIG. 5C depicts the mobile apparatus of FIGS. 5A-5B lifting the wheeled cargo trailer, in accordance with an embodiment hereof.

Turning to FIGS. 5A-5C, the mobile apparatus 80 depicted in FIG. 3 is shown engaging and lifting a wheeled cargo trailer 98, in accordance with an embodiment hereof. Similar to the depiction in FIGS. 4A-4C, the frame 16 of the mobile apparatus 80 is guided into position around the trailer 98 using the transport mechanism 12 and/or the wheels 38 of the frame 16 and drive systems thereof. However, in contrast to the engagement and lifting of the trailer 98 by the mobile apparatus 10 as shown in FIGS. 4A-4C, the mobile apparatus 80 uses the lift assembly 82 to lift the front end 102 of the trailer 98. As discussed with respect to FIG. 3 above, the lift assemblies 46, 82 are configured with a relatively similar or common design.

Referring to FIG. 5A, the frame 16 is propelled by the transport mechanism 12 and/or the wheels 38 of the frame 16 so that it begins enclosing the trailer 98. The trailer 98 enters the object space 28 from the rear end 42 of the frame 16. The mobile apparatus 80 is further moved and guided so that the front end 102 of the trailer 98 is proximate the base portion 22 (as shown in FIG. 3) of the frame 16. Once again, the movement of the mobile apparatus 80 may occur through manually-controlled operation and/or through autonomously-controlled operation, and may be assisted by various components and operations of the vision system described herein which may assist in maintaining proper spacing of the frame 16 from the trailer 98.

Referring to FIG. 5B, once the end 106 of the trailer 98 has reached a desired position relative to the end 42 of the frame 16, the lift assemblies 46, 82 are positioned and/or extended as described herein for engaging and elevating the trailer 98. The frame 16 may be positioned so that the trailer 98 is partially enclosed within the frame 16 in the object space 28, as shown in FIG. 5B. In alternative aspects, the trailer 98 may be fully enclosed within the frame 16 in the object space 28 (e.g., without the end 106 extending past the frame 16). With respect to the aspect shown in FIG. 5B, the partial enclosure of the trailer 98 allows the end 106 of the trailer 98 to remain exposed outside of the frame 16, increasing access to the end 106 of the trailer 98. This may also increase the mobility/range of movement of components located at the end 106 of the trailer 98 and/or at the end 42 of the frame 16 (e.g., such components may include trailer doors and/or retaining elements used to open and/or hold open the trailer doors, as described and shown with respect to FIGS. 6B and 14). Furthermore, when the trailer 98 is located near an external object (e.g., a loading dock), the positioning of the end 106 of the trailer 98 past the end 42 of the frame 16 may increase accessibility to the storage area within the trailer 98, due to the fact that the trailer 98 may then be placed in relatively closer proximity to the external object without a spacing caused due to an extended section of the frame 16. The frame 16 may be sized such that, for a given trailer (e.g., the trailer 98), the end 106 of the trailer 98 extends at least 1, 2, 3, 4, or 5 feet past the end 42 of the frame 16, in addition to other possible distances, to allow for desired positioning and/or mobility.

With continued reference to FIG. 5B, to facilitate lifting the trailer 98, the lifting components 58, 64, 84, 86 (some of which are obscured in FIG. 5B but are shown in FIG. 3) of the lift assemblies 46, 82 may be moved into desired positions along the frame 16 in the y-direction as indicated in FIG. 5B (e.g., using actuators, such as the actuator 35 shown in FIG. 2A or the actuator 95 shown in FIG. 3). This movement can be used to position the lifting components 58, 64, 84, 86 at suitable locations along the elongated portions 24, 26 (e.g., within the available tolerance of movement) for engaging the trailer 98. This movement capability of the lifting components 58, 64, 84, 86 also allows the lift assemblies 46, 82 to accommodate objects of different sizes and configurations (e.g., trailers of different lengths and/or trailers having different underside features, such as lights, reflectors, landing gear, pneumatic equipment, aerodynamic components, etc., that render certain areas not suitable for supporting the lifted trailer).

Once each lifting component 58, 64, 84, 86 is positioned at a suitable location along the frame 16 in the y-direction as indicated in FIG. 5B, actuators respectively coupled to each lifting component 58, 64, 84, 86 may be activated (or alternatively, a manual operation may be performed) to move each of the lifting components 58, 64, 84, 86 from a retracted position to an extended position in which the respective lifting components 58, 64, 84, 86 extend further toward the object space 28, thereby reaching under the trailer 98 into a position suitable for lifting the trailer 98. FIG. 5B depicts non-obscured lifting components 84, 58 in the extended positions reaching, at least partially, under the trailer 98. The remaining lifting components 64, 86 are obscured by the trailer 98 in FIG. 5B but would be in a similar configuration.

FIG. 5C depicts the mobile apparatus 80 and the trailer 98 of FIGS. 5A-5B with the lifting components 58, 64, 84, 86 (components 64 and 86 are obscured by the trailer 98 but are shown in FIG. 3) being raised using the actuators 60, 66, 90, 92 to an elevated position while each lifting component 58, 64, 84, 86 is in the extended position. Accordingly, as shown in FIG. 5C, each lifting component 58, 64, 84, 86 engages and lifts a respective portion of the trailer 98, lifting the landing gear 100 and the rear wheels 104 of the trailer 98 off of the ground. Once the trailer 98 is elevated to the desired height, the transport mechanism 12 and the wheels 38 of the frame 16 are used to maneuver the trailer 98 to a desired location as described herein.

As noted above, by lifting the trailer 98 off of the ground, the pneumatic braking system of the trailer 98 does not need to be pressurized so that the wheels 104 can roll on the ground, and instead the trailer 98 is simply suspended and moved without using the wheels 104. Once the trailer 98 is moved to a desired location, the engaging and lifting process may be reversed to lower and deposit the trailer 98. The lifting components 58, 64, 84, 86 may be lowered using the respective actuators 60, 66, 90, 92, and then the lifting components 58, 64, 84, 86 may be moved from the extended position back to the retracted position, after which the mobile apparatus 80 may be moved using the transport mechanism 12 to move the frame 16 out from over the trailer 98.

Figure 6A:
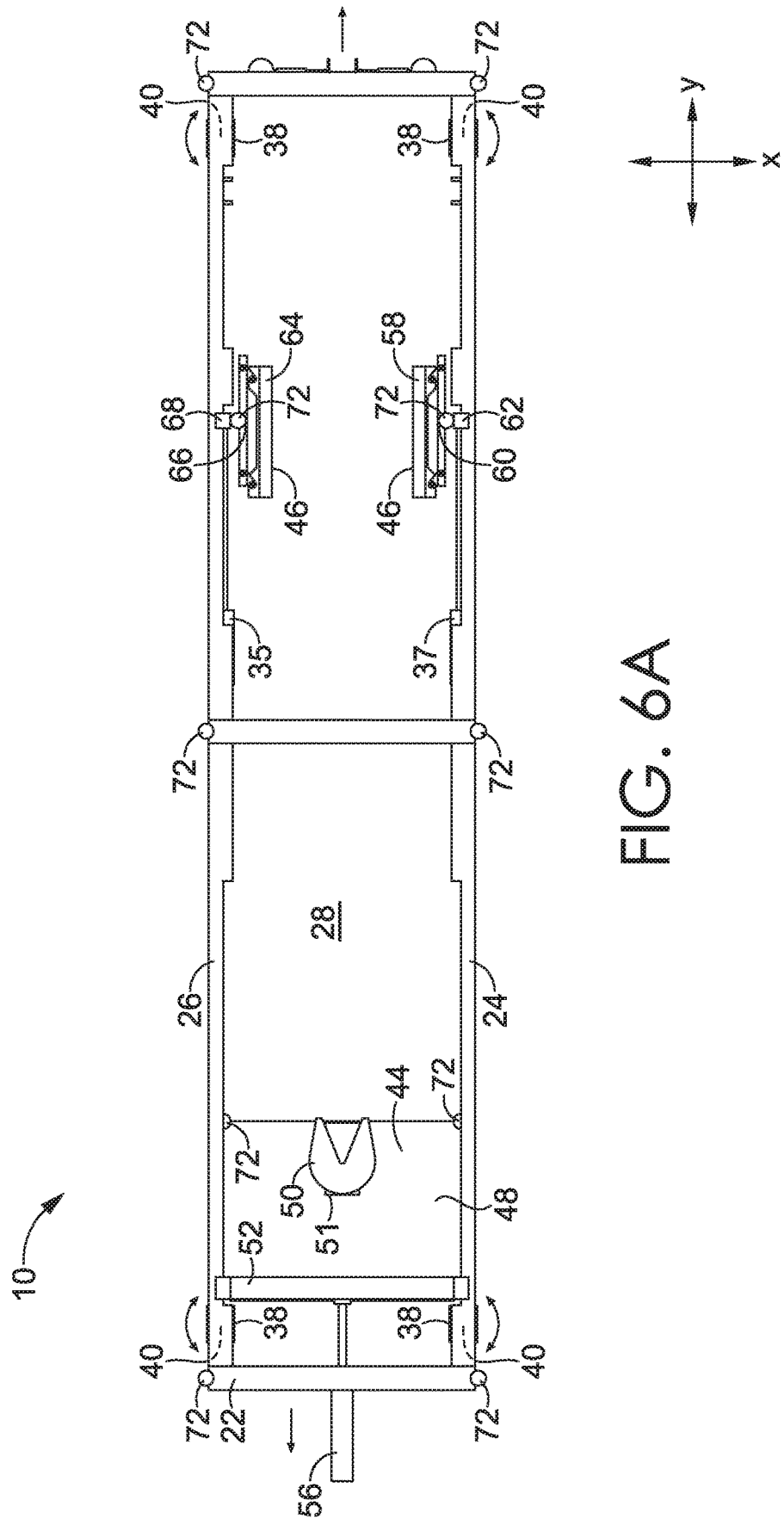
FIG. 6A depicts a top-down plan view of the mobile apparatus shown in FIG. 2A, in accordance with an embodiment hereof.

Referring to FIG. 6A, a top-down plan view of the mobile apparatus 10 shown in FIG. 2A is provided, in accordance with an embodiment hereof. As depicted in FIG. 6A, the wheels 38 may be pivotally/rotatably coupled to the frame 16 with respective wheel attachments 40. The wheel attachments 40 couple a respective drive system to each wheel 38 (e.g., an electric and/or hydraulic motor coupled to a steering column). Each wheel 38, in different contemplated aspects, may be configured to rotate, or rather be steered, up to +/−360 degrees about its respective wheel attachment 40 in order to provide a desired degree of mobility to the mobile apparatus 10. For example, each wheel 38 may be configured to provide up to 30 degrees, 45 degrees, 90 degrees, 180 degrees, or 360 degrees of rotational steering in contemplated embodiments. In some instances such as, for example, those involving a crowded storage depot with reduced space for maneuvering, a higher degree of rotation/steerability of the wheels 38 may be preferable. In further embodiments, some of the wheels 38 may have a fixed orientation.

The lift assemblies 44 and 46 of the mobile apparatus 10 are also shown in FIG. 6A. The lift assembly 44 is movably coupled to the frame 16 and to the base portion 22, and is movable along a length of the frame 16 in the y-direction as indicated in FIG. 6A using the actuator 56. In this sense, the actuator 56 is operable to move the lift assembly 44 closer to and further away from the base portion 22 by moving it along the frame 16. This movement allows the lift assembly 44 to be positioned at a suitable location for engaging a particular structure of an object being lifted (e.g., a kingpin on a trailer of a particular length, such as the trailer 98). The lift assembly 46 is also shown in FIG. 6A. The lifting component 58 of the lift assembly 46 is movably coupled to the elongated portion 24, such that it is both extendable and retractable in the x-direction (e.g., towards and away from the object space 28) as indicated in FIG. 6A. The lifting component 58 is also movable along the elongated portion 24 in the y-direction as indicated in FIG. 6A using an actuator 37 (which may be a linear actuator as described herein). The lifting component 58 is also movable between a raised position and a lowered position at least when in the extended position through operation of the actuator 60.

Similarly, the lifting component 64 is movably coupled to the elongated portion 26 and is extendable and retractable in the x-direction as indicated in FIG. 6A, or rather, towards and away from the object space 28. The lifting component 64 is also movable along the elongated portion 26 in the y-direction as indicated in FIG. 6A using the actuator 35 (which may, for example, be a linear actuator as described herein). The lifting component 64 is also movable between a raised and lowered position using the actuator 66 at least when it is in the extended position. FIG. 6A also depicts components of the vision system (e.g., the detectors 72) that are inward and outward facing. Such components may be placed at various locations around the frame 16, some of which are shown in FIG. 6A.

Figure 6B:
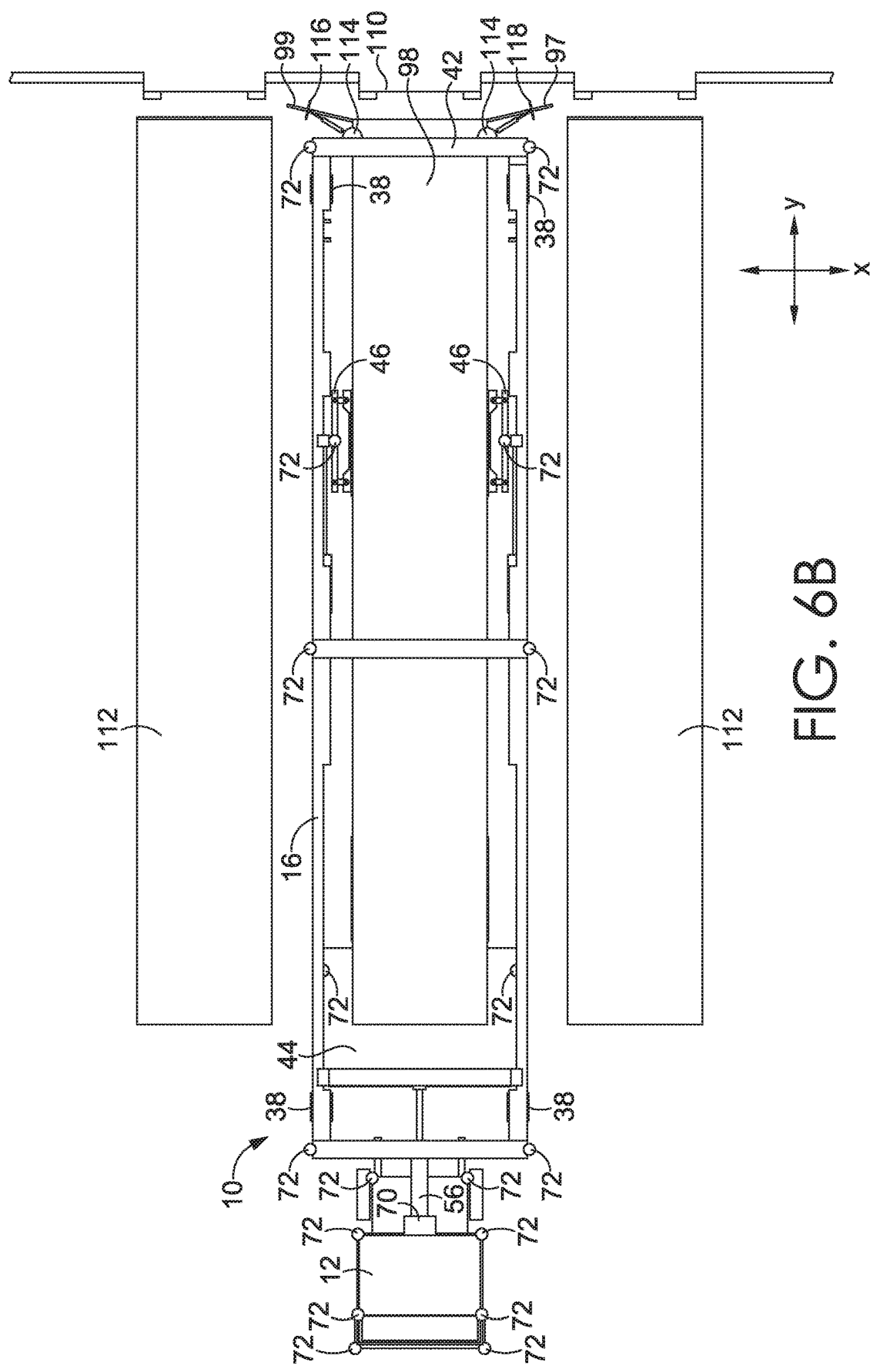
FIG. 6B depicts the top-down plan view of the mobile apparatus shown in FIG. 6A while the mobile apparatus is moved into position around a wheeled cargo trailer positioned adjacent a dock, in accordance with an embodiment hereof.

Referring now to FIG. 6B, a top-down plan view of the mobile apparatus 10 depicted in FIG. 6A, with the mobile apparatus 10 moved into position around a wheeled cargo trailer 98 that is positioned adjacent a dock 110, is provided, in accordance with an embodiment hereof. In certain circumstances, a trailer, such as the trailer 98 shown in FIG. 6B, may be located in a particular location for storage, loading, unloading, or otherwise temporarily located somewhere for certain purposes. As shown in FIG. 6B, in some cases, a trailer may be positioned between or adjacent other trailers or objects, such as the adjacent trailers 112 shown in FIG. 6B. Such adjacent trailers 98, 112 may therefore be in relatively close proximity to each other (e.g., within 1-4 feet of each other). This compact spacing/positioning may facilitate efficient use of space in a yard/depot where trailers are stored, but leaves limited space between the trailers 98, 112 for objects and equipment.

FIG. 6B depicts how the design of the mobile apparatus 10 (and the mobile apparatus 80) allows it to be positioned around the trailer 98 and between the adjacent trailers 112 so that it can engage, lift, and move the trailer 98 using the available tolerances of movement. The mobile apparatus 10 is adapted to move in the x-direction and in the y-direction as indicated in FIG. 6B and rotate about the z-axis as indicated in FIG. 6B. This is accomplished using the transport mechanism 12 and wheels 14 (not shown) thereof and also the wheels 38 of the frame 16 and the drive systems thereof. The mobility and articulation provided by these components allows the mobile apparatus 10 to be maneuvered into position even when there are relatively small tolerances between objects, as, for example, shown in FIG. 6B. In contemplated embodiments, the transport mechanism 12 and the frame 16 may move in unison. In other contemplated embodiments, the frame 16 and the transport mechanism 12 may be separable. In such an embodiment, the transport mechanism 12 may be attachable to the frame 16 to provide power, steering, and/or vision functionality, and/or simply may be used to assist in moving the frame 16, and possibly a lifted object, to a desired location. The frame 16 may then be left in place if desired, possibly with a lifted object, allowing the transport mechanism to relocate, such as to another frame and object.

Additionally, as discussed herein, the vision system and components thereof 70, 72 coupled to the mobile apparatus 10 may be used to facilitate correct positioning of the frame 16 around the trailer 98 without contact/collision. As shown in FIG. 6B, once the frame 16 is positioned around the trailer 98, the lift assemblies 44, 46 can be adjusted (e.g., in the x-direction, the y-direction, and/or the z-direction as indicated in FIG. 6B using the respectively coupled actuators discussed herein) to engage and lift the trailer 98, raising it off of the ground. Once the trailer 98 is lifted, the transport mechanism 12 can transport the trailer 98 in suspended fashion to a desired location.

FIG. 6B further depicts a retaining mechanism 114 comprising a first-side retaining element 116 and a second-side retaining element 118, each of which is movable between a first configuration and a second configuration. In the first configuration, each of the retaining elements 116, 118 is positioned such that it does not interfere with movement of a respective door 97, 99 of the trailer 98. This allows the doors 97, 99 of the trailer 98 to be opened and closed without interference. When the doors 97, 99 of the trailer 98 are open, and each retaining element 116, 118 is in the second configuration such that it is engaging a respective door 97, 99, as shown in FIG. 6B, the retaining elements 116, 118 may hold the doors 97, 99 open, restricting them from swinging during movement of the mobile apparatus 10 and trailer 98. Therefore, when the mobile apparatus 10 moves the lifted trailer 98 towards the dock 110 for loading and/or unloading or other purposes with the doors 97, 99 open, the doors 97, 99 can remain open without swinging closed due to the movement. The retaining elements 116, 118 may also include actuators that allow the retaining mechanism 114 to open and close the doors 97, 99 in further embodiments.

Figure 7B:
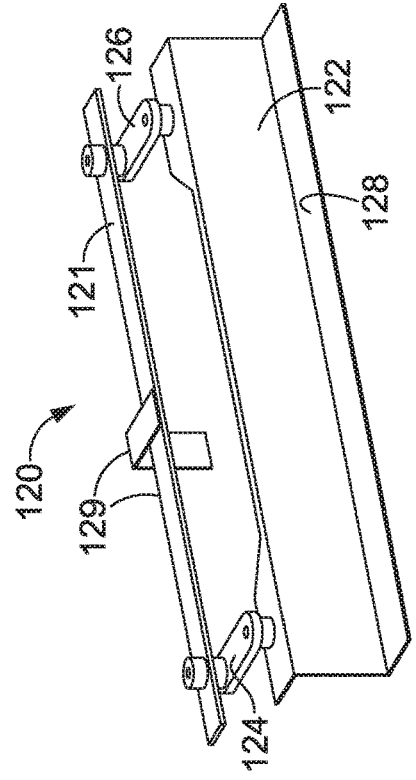
FIGS. 7A-7B show one example lifting component of a lift assembly that is moved between a retracted position and an extended position, in accordance with an embodiment hereof.
Figure 7A:
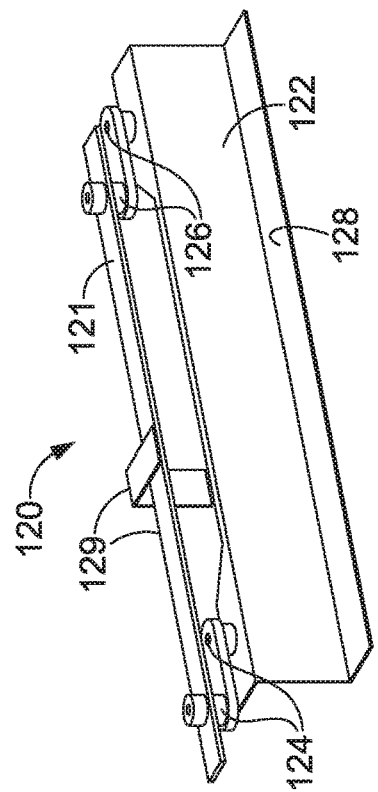

FIGS. 7A-7B depict an example lifting component 120 of a lifting assembly, such as the lifting assembly 46 shown in FIG. 2A, useable for engaging and lifting an object, such as a wheeled cargo trailer, in accordance with an embodiment hereof. The lifting component 120 has an elongated shape that may facilitate load distribution. The lifting component 120 includes a support portion 121 which may be coupled to a frame, such as the frame 16 shown in FIGS. 2A and 3, or to a support structure and/or actuator mounted thereon, such as the support structure 62 and actuator 60 shown in FIG. 2A. In this sense, the lifting component 120 may be mounted on an actuator adapted to raise and lower it as described herein.

The lifting component 120 shown in FIGS. 7A-7B also includes a lifting portion 122, which is movably coupled to the support portion 121. The lifting portion 122 is movable between a retracted position (shown in FIG. 7A) and an extended position (shown in FIG. 7B). The retracted position may allow the lifting portion 122 to be positioned away from an area under an object, and the extended position may allow the lifting portion 122 to be positioned in the area under the object (e.g., for engaging and lifting the object). The lifting portion 122 is movably coupled to the support portion 121 with a pair of pivotal couplings 124, 126 that allow the lifting portion 122 to be pivoted out to the extended position. It should be noted that, although not depicted in FIGS. 7A-7B, in some contemplated embodiments, one or more actuators (e.g., rotational actuators, which may be electrically driven) may be coupled to the pivotal couplings 124, 126 to allow the lifting portion 122 to be moved between the retracted position and the extended position in actuated fashion. Further, as shown in FIGS. 7A-7B, the lifting portion 122 includes an extended planar portion 128 that provides a surface for engaging (e.g., moving into contact with) a portion of an object (e.g., an underside surface of the trailer 98). Further depicted in FIGS. 7A-7B is an example coupling structure 129 that may be used to attach the lifting component 120 to a lift actuator used to raise and lower the lifting component 120, or to another structure.

Figure 8B:
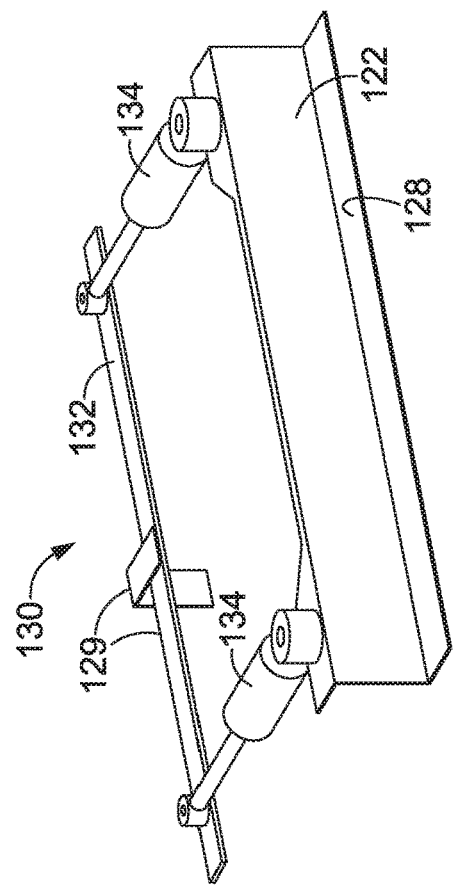
FIGS. 8A-8B show another example lifting component of a lift assembly that is moved between a retracted position and an extended position, in accordance with an embodiment hereof.
Figure 8A:
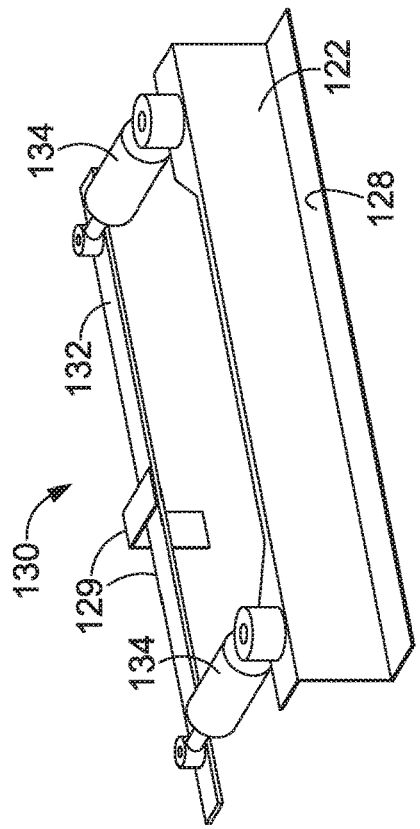

FIGS. 8A-8B depict another example lifting component 130 that can be used with a lift assembly, such as the lift assembly 46 shown in FIG. 2A, to engage and lift an object, in accordance with an embodiment hereof. The lifting component 130 includes a support portion 132, which may be movably coupled to a frame, such as the frame 16 shown in FIG. 2A, or to another structure using the coupling structure 129. The lifting component 130 also includes the lifting portion 122 and the extended planar portion 128 also provided with the lifting component 120 depicted in FIGS. 7A-7B.

Like the lifting component 120 shown in FIGS. 7A-7B, the extended planar portion 128 can be used for engaging and supporting an object when the lifting portion 122 is in the extended position. However, in contrast to the lifting component 120 depicted in FIGS. 7A-7B, the lifting portion 122 of the lifting component 130 shown in FIGS. 8A-8B is not coupled to the support portion 132 with a pair of pivotal couplings that move the lifting portion 122 between the retracted position and the extended position (e.g., using a rotational actuator and control system coupled to the same). Instead, the lifting portion 122 of the lifting component 130 is movably coupled to the support portion 132 with a pair of linear actuators 134. Each of the linear actuators 134 may be electrically driven, hydraulically-driven, and/or screw-driven, among other actuation methods and mechanisms. The linear actuators 134 are operable to move the lifting portion 122 from the retracted position, shown in FIG. 8A, to the extended position, shown in FIG. 8B, to allow the lifting portion 122, and by association the extended planar portion 128, to reach at least partially under an object so that the lifting portion 122 can be raised using a lift actuator to lift the object.

Figure 9B:
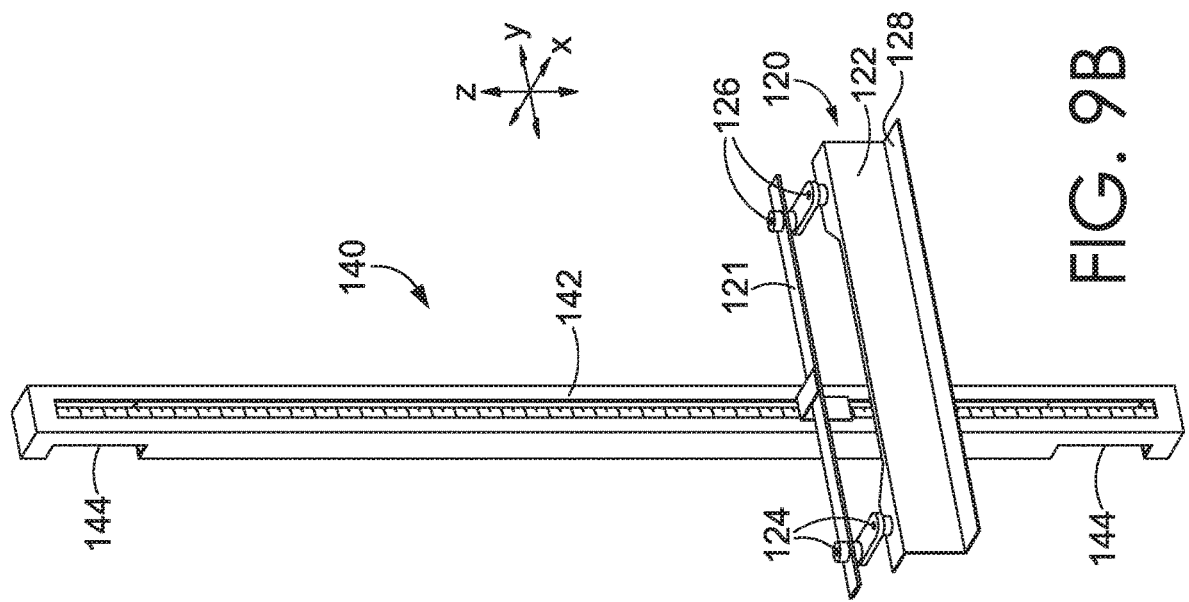
FIG. 9B depicts another example lifting component and actuator assembly, in accordance with an embodiment hereof.
Figure 9A:
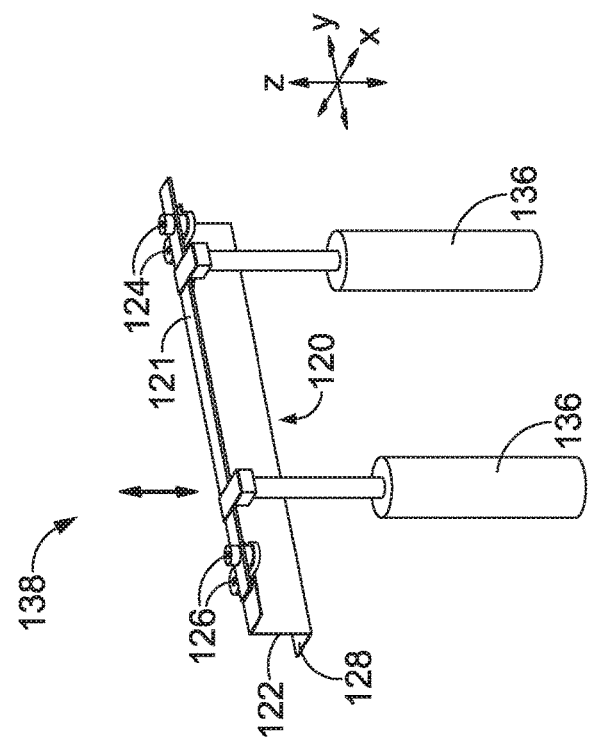
FIG. 9A depicts an example lifting component and actuator assembly, in accordance with an embodiment hereof.

Referring to FIG. 9A, a lifting component and actuator assembly 138 configured to be attached to a frame and used for engaging and lifting an object, such as a wheeled cargo trailer enclosed by the frame, is provided, in accordance with an embodiment hereof. The assembly 138 shown in FIG. 9A includes the lifting component 120 from FIGS. 7A-7B coupled to a pair of linear actuators 136. The linear actuators 136 are operable to move the lifting component 120 between a raised position and a lowered position, to allow for raising and lowering an object.

To provide an example, when the lifting component 120 is in the extended position such that it is positioned at least partially under an object, as discussed with respect to FIGS. 7A-7B, the linear actuators 136 may be operated to raise the lifting component 122 from a lowered position to a raised position and vice versa to raise and lower a portion of the object. The actuators 136 may be linear actuators as shown in FIG. 9A (e.g., hydraulically-driven actuators coupled to a hydraulic system), screw-driven actuators, electrically-driven actuators, belt or gear-driven actuators, and/or any other type of actuator suitable for raising and lowering the lifting component 120, like any of the other actuators described herein. Only two actuators 136 are shown in FIG. 9A for example purposes, but more or fewer actuators may be used in other embodiments.

FIG. 9B depicts another lifting component and actuator assembly 140 that can be coupled to a frame and used for engaging and lifting an object, such as a wheeled cargo trailer, in accordance with an embodiment hereof. The assembly 140 shown in FIG. 9B may be coupled between portions of a frame (e.g., between the elongated portions 26, 32 of the frame 16 shown in FIG. 2A). The assembly 140 includes the lifting component 120. The lifting component 120 includes the lifting portion 122 which is movably coupled to the support portion 121 such that it is movable between a retracted position and an extended position using the pair of pivotal couplings 124, 126 and, in certain aspects, one or more rotational actuators.

In FIG. 9B, the lifting portion 122 is shown in the extended position. Further, the lifting component 120 is movably/adjustably coupled to a support member 142 that supports the lifting component 120. The support member 142 may enclose and/or support additional actuator components that are operable to move the lifting component 120 between the lowered position and the raised position. For example, the support member 142 may at least partially contain, enclose, and/or support a piston, belt, linear-actuator, track, movable or slidable coupling, and/or other components that enable movement of the lifting component 120 up and down the support member 142. The support member 142 may also be fixedly or movably coupled to a frame (e.g., via a track that allows slidable movement of the support member 142 along the frame), such as the frame 16 shown in FIG. 2A. The support member 142 further includes example coupling portions 144 that engage with corresponding structures on a frame.

Example Adapters for Pneumatic Braking Systems

Figure 10B:
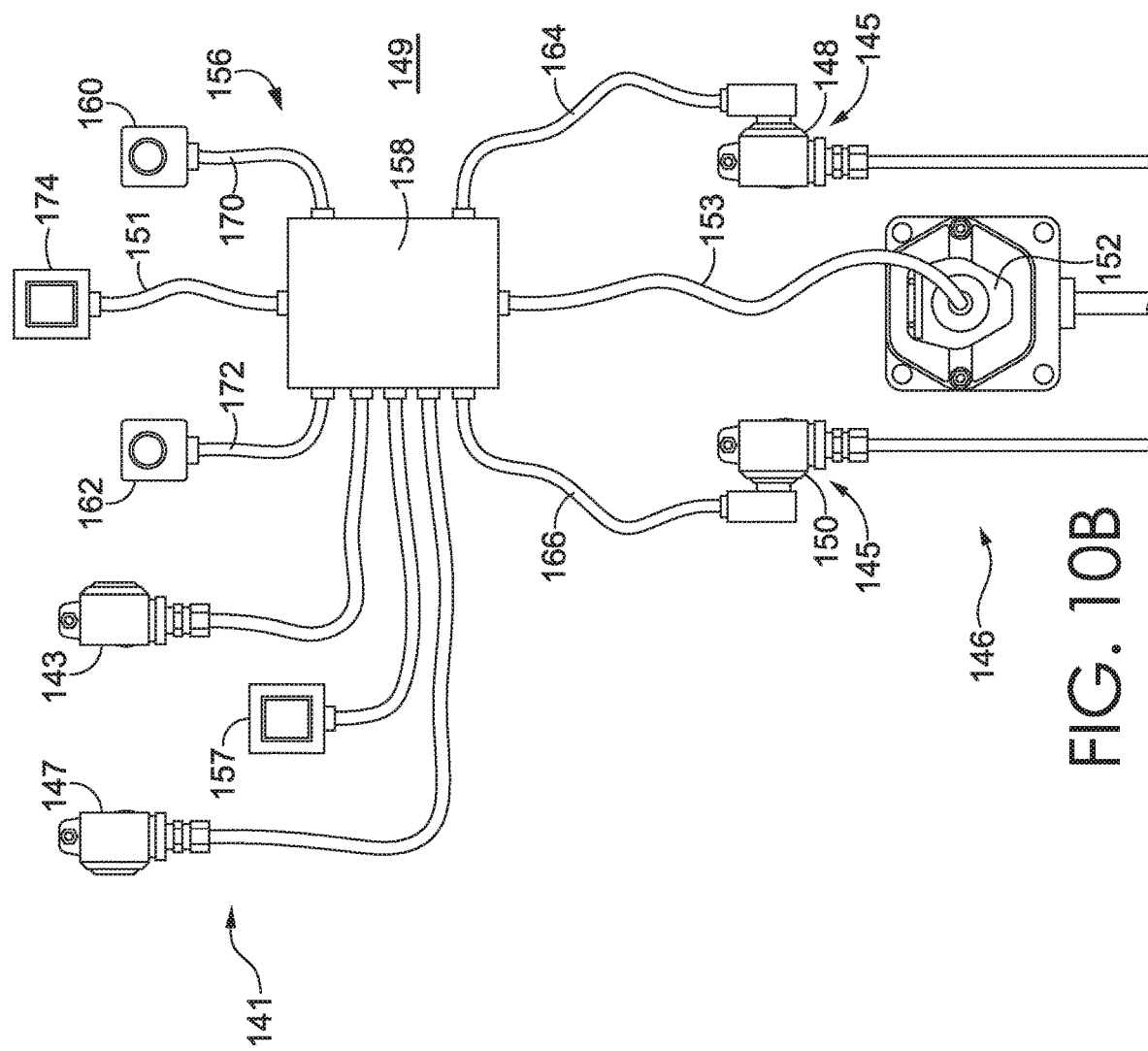
FIG. 10B depicts an example pneumatic adapter coupled with the glad hands connection shown in FIG. 10A, in accordance with an embodiment hereof.
Figure 10A:
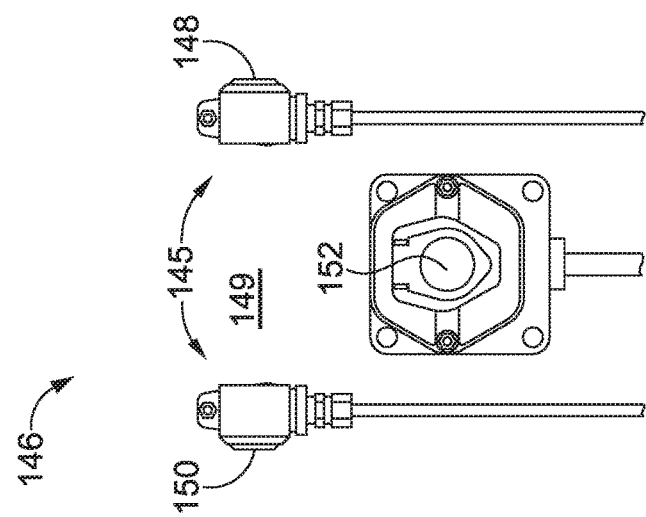
FIG. 10A depicts an example glad hands connection used with a pneumatic braking system, in accordance with an embodiment hereof.

Referring to FIG. 10A, trailer connections 146 for a pneumatic braking system, such as one incorporated into a wheeled cargo trailer, is provided, in accordance with an embodiment hereof. In certain circumstances, a wheeled cargo trailer, such as the trailer 98 shown in FIG. 4A, may have a pneumatic braking system that includes pneumatically-operated brakes for its wheels that remain locked until a pressurized air source is connected. For example, a pneumatic braking system may include a pneumatically-powered emergency brake and a pneumatically-powered standard brake that are supplied with pressurized air through separate pneumatic conduits to unlock/control the respective brakes. The pressurized air for the pneumatic braking system may be provided through a glad hands connection, such as the glad hands connection 145 shown in FIG. 10A that includes pneumatic couplings 148, 150 that can be used for pneumatically attaching one or more pressurized air sources to the braking system.

The glad hands connection 145 shown in FIG. 10A specifically includes a pneumatic coupling 148 (e.g., for pneumatically powering an emergency brake) and a pneumatic coupling 150 (e.g., for pneumatically-powering a standard brake). The trailer connections 146 further includes a power/control coupling 152. The power/control coupling 152 allows an electrical power source to be connected to the trailer connections 146 (e.g., to power brake lights on the trailer) and also allows a control connection to be connected to the trailer connections 146 (e.g., to enable control of the brake lights on the trailer). In operational circumstances, the couplings 148, 150, 152 of the trailer connections 146 may be positioned on a wheeled cargo trailer at various locations, orientations, and/or spacings. As a result, a common location, orientation, and spacing of such connections may not readily be found on trailers using such connections. FIG. 10A depicts the trailer connections 146 as it might be placed on a surface 149 of a trailer (e.g., at the first end 102 of the trailer 98 shown in FIG. 5A).

To move a trailer with pneumatically operated brakes connected to a glad hands connection, a driver of a tractor would normally manually connect a pressurized air source to the glad hands connection to unlock the brakes. However, this process takes additional time for the driver, and becomes more difficult with an autonomous vehicle due to the fact that certain trailers may not have a standardized connection configuration. Therefore, a pneumatic adapter, such as the adapter 156 shown in FIG. 10B, may be used with the glad hands connection and/or braking system to facilitate and simplify attachment of a pressurized air source and/or power/control connection to the system. The adapter 156 may be mounted on the surface 149 shown in FIG. 10B and may provide, for example, pneumatic couplings that are positioned at common locations, orientations, and spacings to facilitate automated and consistent placement of connections for a pneumatic braking system.

FIG. 10B shows the adapter 156 discussed above coupled to the trailer connections 146 shown in FIG. 10A. The trailer connections 146 includes the pneumatic couplings 148, 150 of the glad hands connection 145 and also the power/control coupling 152 mounted on the surface 149. In contrast to the couplings 148, 150, 152 of the trailer connections 146, which may be mounted, oriented, and spaced irregularly on various trailers, the adapter 156 provides standardized/established locations, orientations, and spacings for its corresponding connections, as discussed further below.

The adapter 156 includes an adapter box 158 that provides an interface with the trailer connections 146. More specifically, the adapter box 158 is connected to a pneumatic coupling 160 attached to the adapter box 158 through a pneumatic conduit 170 and is connected to a pneumatic coupling 162 attached to the adapter box 158 through a pneumatic conduit 172. The adapter box 158 further includes a pneumatic conduit 164 that provides a pneumatic connection between the adapter box 158 and the pneumatic coupling 148 of the glad hands connection 145 and includes a pneumatic conduit 166 that provides a pneumatic connection between the adapter box 158 and the pneumatic coupling 150 of the glad hands connection 145. The conduits 164, 170 and the adapter box 158 pneumatically couple the pneumatic coupling 160 and the pneumatic coupling 148 of the glad hands connection 145, and the conduits 166, 172 and the adapter box 158 pneumatically couple the pneumatic coupling 162 and the pneumatic coupling 150 of the glad hands connection 145.

The pneumatic couplings 160, 162 of the adapter 156 shown in FIG. 10B are positioned on the surface 149 of the trailer at preconfigured locations, orientations, and spacings, so as to facilitate automated attachment of pressurized air sources to the pneumatic braking system (e.g., using an autonomous vehicle with correspondingly located/spaced/oriented connections). The adapter 156 further includes a power/control coupling 174 that is coupled to the adapter box 158 via a conduit 151. The power/control coupling 174 allows a power/control source to be coupled to the adapter 156 to provide power and control signals to the power/control coupling 152 of the trailer connection 146 via a power/control conduit 153. It should be noted that in alternative embodiments, the pneumatic couplings 160, 162 and the power/control coupling 174 may not be attached to the adapter box 158 via the conduits 151, 170, 172, but instead may be positioned directly on the adapter box 158 or may be located on separate adapter structures. Other configurations and arrangements of the adapter 156 are contemplated herein. A corresponding mateable connection assembly that provides the pneumatic/power/control sources for the adapter 156, which may be useable by or mounted on the autonomous transport aspects discussed herein, is also contemplated.

FIG. 10B depicts a configuration with an additional set of trailer connections 141 that are connected to the adapter box 158. This additional set of trailer connections 141 may or may not be included in different embodiments. For the aspect depicted in FIG. 10B, such connections allow for a separate manual attachment configuration for the braking system, separate from the trailer connections 146. The trailer connections 141 include a pneumatic coupling 143 that is pneumatically connected to the adapter box 158, which provides a pneumatic connection through the pneumatic conduit 164 to the pneumatic coupling 148 of the glad hands connection 145. The trailer connections 141 also include a pneumatic coupling 147 that is pneumatically connected to the adapter box 158, which provides a pneumatic connection through the pneumatic conduit 166 to the pneumatic coupling 150 of the glad hands connection 145. The additional set of trailer connections 141 further includes a power/control coupling 157 that is coupled to the adapter box 158, which provides a power/control connection through the conduit 153 to the power/control coupling 152 of the trailer connections 146. The configuration shown in FIG. 10B allows the trailer connections 146 shown in FIG. 10A to remain attached to the adapter box 158 while the similarly configured trailer connection 141 is operable for manual attachment of connections that would otherwise have been connected directly to the trailer connections 146. This may permit a manual attachment of pneumatic and power/control connections to the braking system without having to disconnect the adapter 156 from the trailer connections 146. The attachment of pneumatic sources to either the pneumatic couplings 143, 147 or to the pneumatic couplings 160, 162 may occur without a release of air through the unused pneumatic couplings through use of an interlock incorporated into the adapter box 158, which is described further below with respect to FIG. 12A.

Figure 10C:
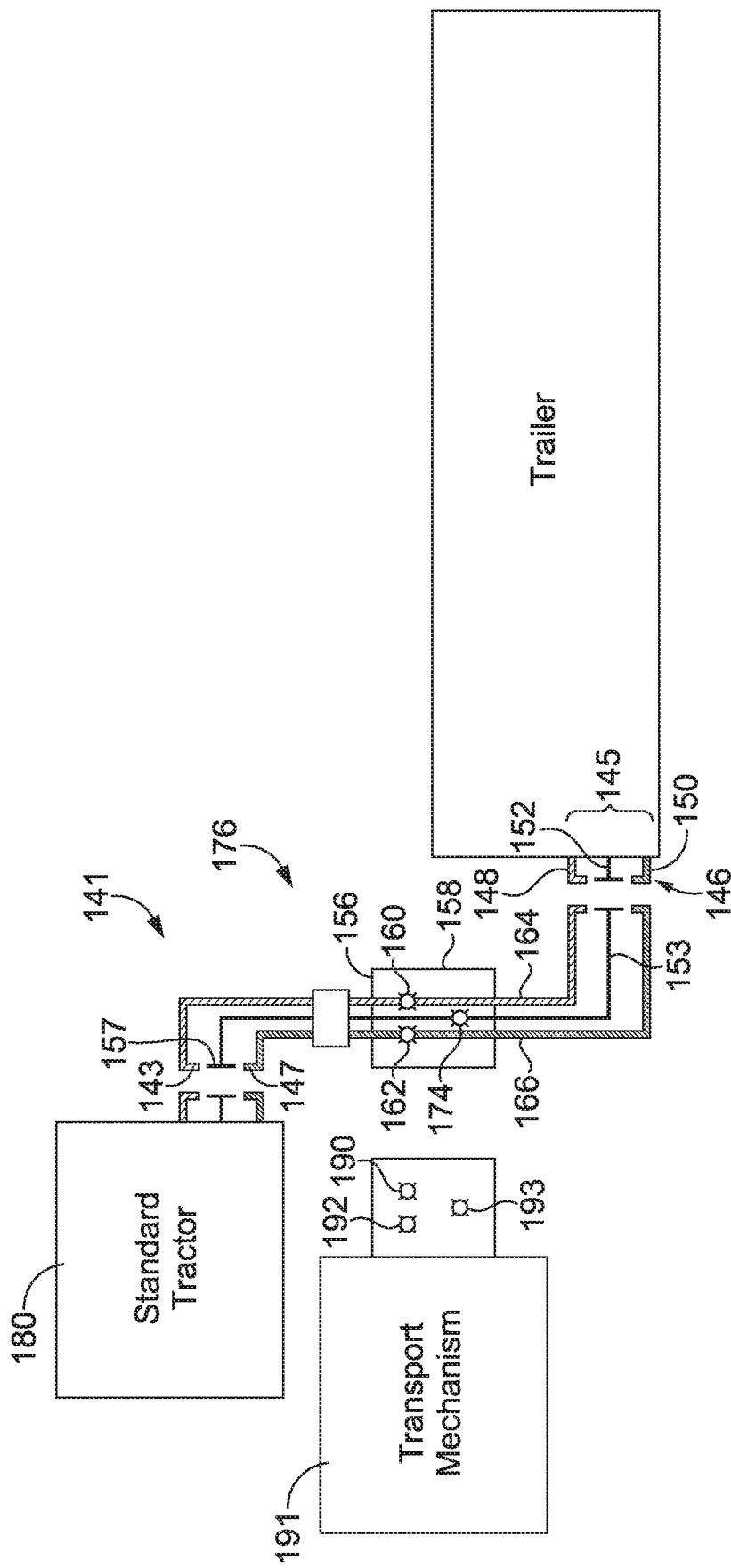
FIG. 10C depicts a diagram of an example pneumatic assembly that incorporates a glad hands connection and a pneumatic adapter, in accordance with an embodiment hereof.

FIG. 10C depicts a diagram of an example pneumatic braking system 176 that includes the trailer connections 146 and adapter 156 shown in FIG. 10B, in accordance with an embodiment hereof. The pneumatic braking system 176 is designed so that the trailer connections 146, and the glad hands connection 145 thereof, is positioned at a first location in the flow path of the pneumatic braking system 176, with the pneumatic couplings 148, 150 and the power/control coupling 152 being accessible from the first location. Further attached to the pneumatic braking system 176 at a second location is the adapter 156. The adapter 156 includes the pneumatic couplings 160, 162 and the power/control coupling 174 as described herein with respect to FIG. 10B. The adapter 156 is coupled into the flow path of the pneumatic braking system 176, as shown in FIG. 10B, providing a connection point for automated pneumatic and power/control connections.

The location at which the adapter 156 is positioned may be a surface of a trailer, such as a surface located at the first end 102 of the trailer 98 shown in FIG. 11. This positioning supports engagement with corresponding pneumatic and power/control connections located on a transport mechanism 191 shown in FIG. 10C. The transport mechanism 191 may be an autonomously operated transport mechanism as described herein. The transport mechanism 191 shown in FIG. 10C includes pneumatic couplings 190, 192 that are mateable/attachable with the pneumatic couplings 160, 162 located on the adapter 156. The transport mechanism 191 also includes a power/control coupling 193 that is mateable/attachable with the power/control coupling 174 located on the adapter 156. Once again, by introducing the adapter 156 into the pneumatic braking system 176 as shown in FIG. 10C, standardized locations, orientations, and spacings for pneumatic and power/control couplings may be provided. This standardized arrangement can support consistent and improved attachment of such connections, including in circumstances where the attachment is performed by an autonomous vehicle.

The alignment and connection of the pneumatic couplings 190, 192 and the power/control coupling 193 located on the transport mechanism 191 with the pneumatic couplings 160, 162 and the power/control coupling 174 located on the adapter 156 may be facilitated using a vision system configured and used as described elsewhere herein. For example, cameras, sensors, and/or processing components of the vision system may be used to detect the location of the couplings 160, 162, 174 on the trailer to support proper alignment and attachment of the couplings 190, 192, 193 to the same. The attachment of the couplings 190, 192, 193 to the couplings 160, 162, 174 may further be facilitated by mechanical components that are actuated and/or otherwise operated to physically attach the couplings 190, 192, 193 to the couplings 160, 162, 174. For example, one or more linear actuators may be coupled to the transport mechanism 191 that are operable to move the couplings 190, 192, 193 into contact and/or engagement with the respective couplings 160, 162, 174 of the trailer connections 146. The couplings 190, 192, 193 may be placed at standardized (e.g., "known") locations on the transport mechanism 191 so that they correspond in location, orientation, and spacing with the couplings 160, 162, 174 of the adapter 156.

FIG. 10C further depicts the additional set of trailer connections 141 described with respect to FIG. 10B, which are connected to the adapter 156 via the adapter box 158 thereof. The pneumatic coupling 143 and the pneumatic coupling 147 of the trailer connections 141 are used to provide a pneumatic connection with corresponding pneumatic couplings located on a standard tractor 180, shown in FIG. 10C. The power/control coupling 157 of the trailer connections 141 can also be attached to a corresponding power/control coupling located on the standard tractor 180. These connections may be arranged for manual attachment, or in other words, may not necessarily be arranged at standardized, established locations as with the connections on the adapter 156. The pneumatic isolation of the pneumatic couplings 160, 162 or the pneumatic couplings 148, 150 during use of either can be provided via the interlock 194 described below with respect to FIGS. 12A and 12B.

Figure 13:
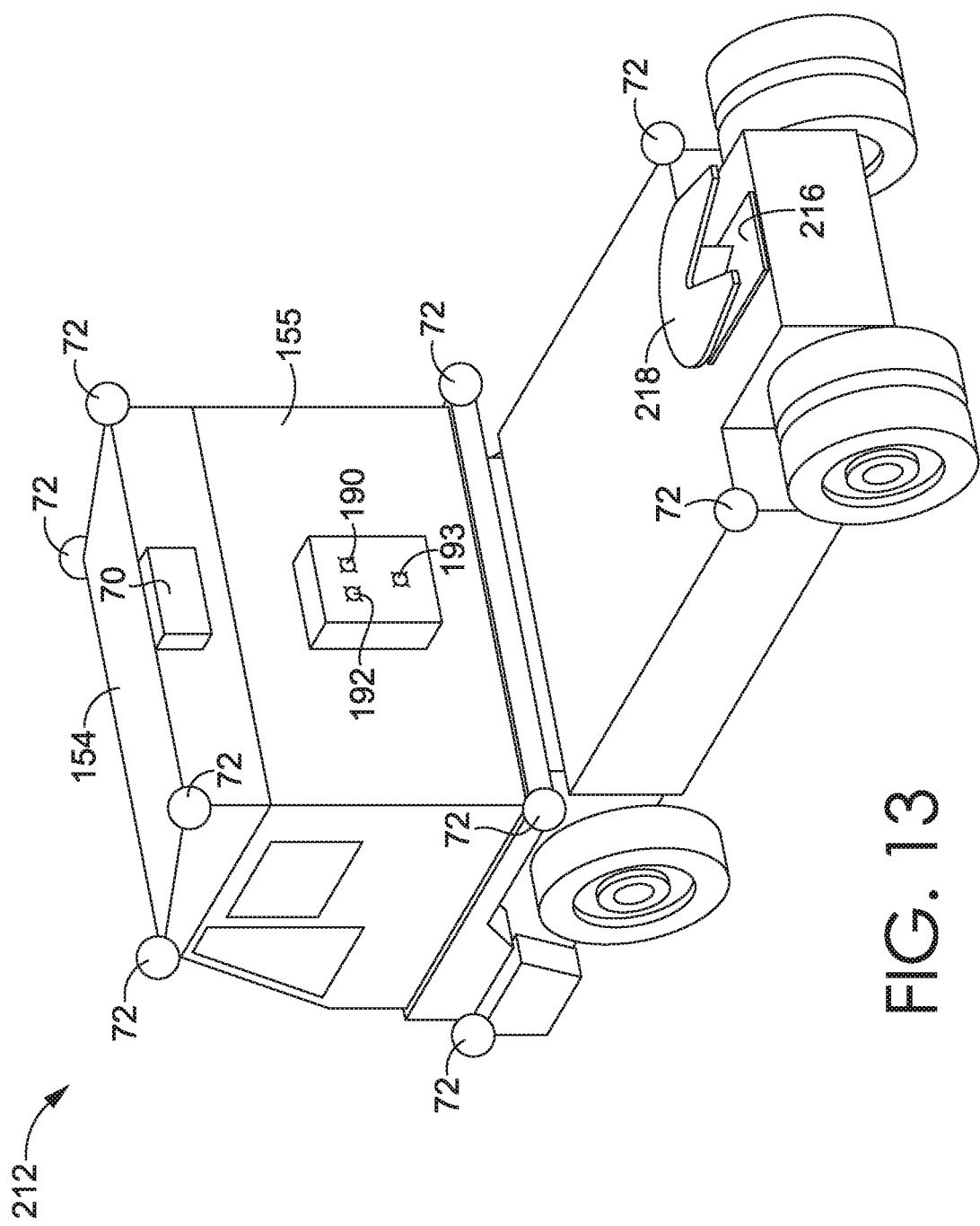
FIG. 13 depicts another mobile apparatus that includes connections that can be attached to corresponding connections located on an adapter positioned on a wheeled cargo trailer, in accordance with an embodiment hereof.

FIG. 11 depicts the trailer 98 of FIG. 4A with the trailer connections 146 and adapter 156 of FIGS. 10B-10C both mounted thereon, in accordance with an embodiment hereof. FIG. 11 shows how the adapter 156 can be coupled into the pneumatic braking system 176 of the trailer 98 between the glad hands connection 145 and the braking connections 188, which are located adjacent the wheels 104 of the trailer 98. As shown in FIG. 11, the trailer connections 146 and the adapter 156 are coupled/mounted to a surface of the trailer 98 (e.g., at the forward end 102). The positioning of the adapter 156 and the trailer connections 146 supports the attachment of pneumatic and power/control couplings, both from a standard tractor during normal operation (e.g., using the trailer connections 146 located on the trailer 98) and from a separate, and possibly autonomous, transport mechanism (e.g., using the adapter 156) used to shift the trailer. One example transport mechanism 154 that has mateable components adapted to engage the adapter 156 located on the trailer 98 is shown in FIG. 13. The couplings 190, 192, 193 shown in FIG. 10C may be positioned on a trailer-facing surface 155 of the transport mechanism 154 shown in FIG. 13 so that they are positioned to mateably engage with the couplings 160, 162, 174 of the adapter 156 positioned at the first end 102 of the trailer 98 as shown in FIG. 11.

Figure 12A:
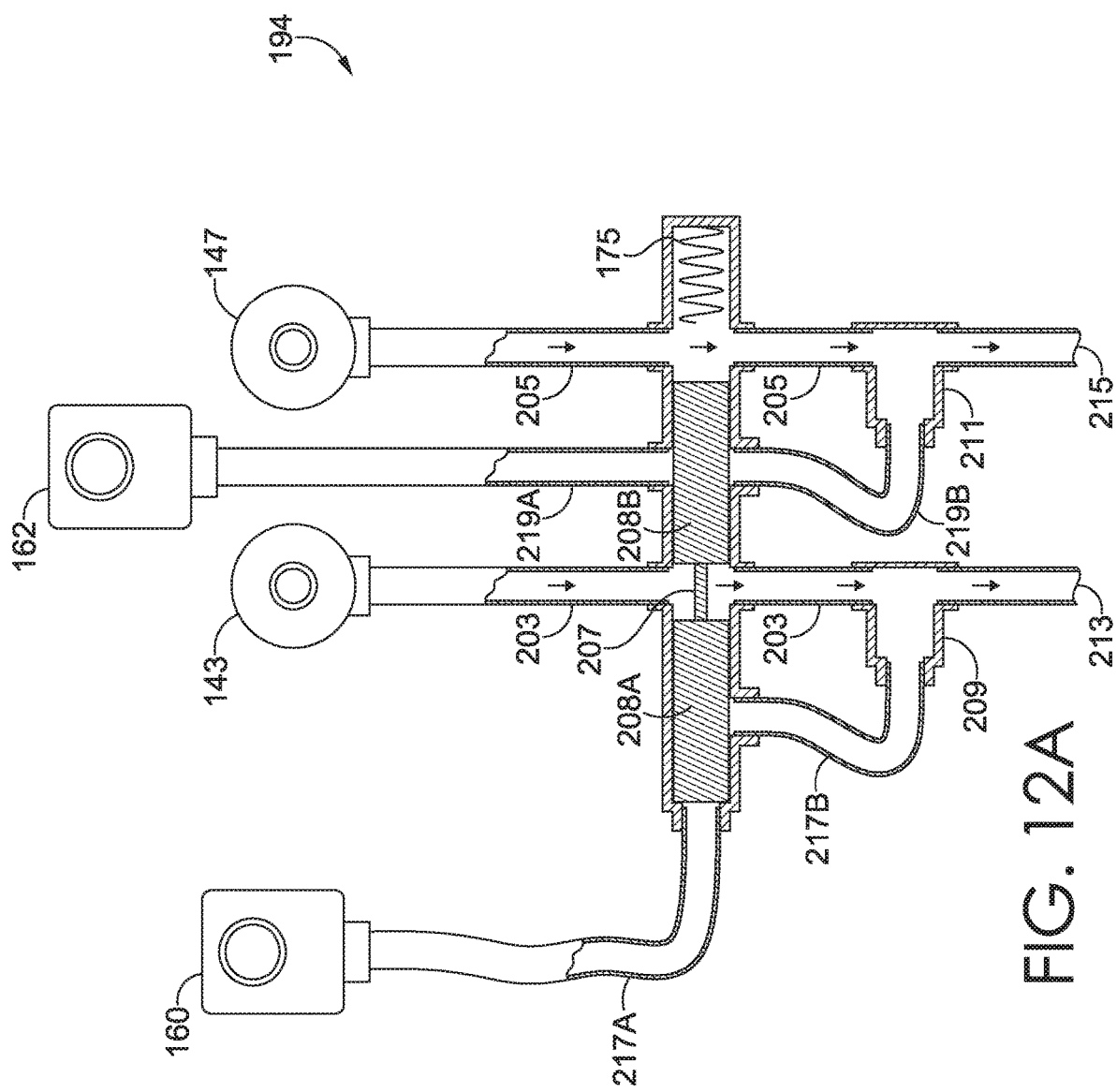
FIG. 12A depicts a partial, cross-section view of an example interlock for a pneumatic adapter, the interlock shown in a first configuration, in accordance with an embodiment hereof.

Referring to FIGS. 12A-12B, a partial, cross-section view of an interlock 194 which may be used to provide selective paths of airflow through an adapter for a pneumatic braking system, such as the adapter 156 shown in FIG. 10B, is provided, in accordance with an embodiment hereof. The interlock 194, in one aspect, may be located within the adapter box 158 shown in FIG. 10B, and may be configured, as shown in FIGS. 12A-12B, to allow different sets of pneumatic couplings to be used alternatively, and in isolation, to provide pressurized air to a pneumatic braking system connected to the interlock 194.

Referring specifically to the interlock 194, the pneumatic couplings 143, 147 of the trailer connections 141 shown in FIG. 10B are pneumatically connected to the interlock 194, allowing standard pneumatic couplings configured for a glad hands connection, such as the glad hands connection 145 shown in FIG. 10A, to be attached to the braking system as described above (e.g., manually). The interlock 194 also includes the pneumatic couplings 160, 162 associated with the adapter 156 shown in FIG. 10B. The pneumatic couplings 160, 162 may be mounted, as described herein, at standardized locations, orientations, and spacings as described herein to support automated attachment of a pneumatic source (e.g., using an autonomous transport mechanism).

The interlock 194 includes a pair of movable components 208A, 208B connected by a linking member 207. These movable components 208A, 208B located within the interlock 194 allow a pneumatic source to be used with either the pneumatic couplings 143, 147 in isolation or alternatively with the pneumatic couplings 160, 162 in isolation. In other words, the movable components 208A, 208B are configured to block the flow of pressurized air out of the unused pair of pneumatic couplings 143, 147 or 160, 162.

The movable components 208A, 208B are adjustable/movable between a first position, shown in FIG. 12A, and a second position, shown in FIG. 12B. The first position allows a pneumatic source coupled to the pneumatic couplings 143, 147 to provide airflow through conduits 203, 205 and through junctions 209, 211, and on to an attached pneumatic braking system via conduits 213, 215, respectively. In the first position, the pair of movable components 208A, 208B are moved in unison to block the escape of air from the pneumatic couplings 160, 162, respectively, as shown in FIG. 12A. The second position allows a pneumatic source coupled to the pneumatic couplings 160, 162 to provide airflow through conduits 217A, 217B and 219A, 219B and through the junctions 209, 211, and on to the pneumatic braking system through the conduits 213, 215, respectively. In the second position, the pair of movable components 208A, 208B are moved in unison to block the escape of air from the pneumatic couplings 143, 147, respectively, as shown in FIG. 12B. In this sense, the interlock 194 allows one set of pneumatic couplings to be used in isolation without a release of pressurized air from the unused couplings.

The location of the movable components 208A, 208B within the interlock 194 may be controlled in different ways. For example, the location may be controlled mechanically, electrically, and/or pneumatically. In one instance, if a power/control connection is attached to the braking system, a power source may then be supplied to the interlock 194, which may initiate electrical actuation that adjusts the position of the movable components 208A, 208B (e.g., from the first position to the second position or vice versa) to provide a desired pneumatic pathway. This actuation may be accomplished, for example, using a solenoid.

Alternatively, or in addition, the location of the movable components 208A, 208B may be controlled by supplied airflow. For example, when a pneumatic source is attached to the interlock 194 through either set of pneumatic couplings 143, 147 or 160, 162, a position of the movable components 208A, 208B may be adjusted or remain the same to provide a corresponding pneumatic path through the interlock 194. Further, in some embodiments, a resting, or default, configuration of the interlock 194 may be established. For example, a biasing member 175 (e.g., a spring as shown in FIGS. 12A-12B) may be incorporated into the interlock 194 so that in a resting state, in which no pneumatic sources are connected to the interlock 194, the interlock 194 remains in a desired position, such as the first position shown in FIG. 12A, to allow the desired pneumatic connections 143, 147 or 160, 162 to remain open for use. It should be noted that the default position may be the first position or the second position, as described herein.

FIG. 13 depicts another embodiment of a mobile apparatus 212 that includes connections useable for attaching a pneumatic and/or power/control source to an adapter located on a wheeled cargo trailer as described herein, in accordance with an embodiment hereof. The mobile apparatus 212 includes a lift assembly 216 that is operable to lift one end of an object, such as a wheeled cargo trailer. The lift assembly 216 includes a movable lifting component 218 (e.g., as shown in the embodiment of FIG. 13, a fifth wheel adapted to engage and lift a kingpin located on a trailer). The mobile apparatus 212 may be configured for autonomous operation and attachment to a trailer, and may further include the vision system components described herein.

The mobile apparatus 212 shown in FIG. 13 includes the pneumatic and power/control couplings 190, 192, 193 discussed with respect to FIG. 10C. These couplings 190, 192, 193 can be aligned and engaged with corresponding couplings located on an adapter, such as the adapter 156 shown in FIG. 10C, that is mounted on a trailer as described herein. This allows the mobile apparatus 212 to connect a pneumatic and power/control source to the trailer as described with respect to FIGS. 10A-10C, in order to unlock/operate the pneumatic braking system of the trailer. The mobile apparatus 212 can then move the trailer without having to lift it to circumvent the restricted movement caused by the locked pneumatic braking system. As shown in FIG. 13, the mobile apparatus 212 includes the vision components 70, 72 described herein. The vision system components 70, 72 may be used for guiding the mobile apparatus 212 to a desired location, locating a trailer to be engaged, and/or locating pneumatic and/or power/control couplings mounted on a trailer for engagement with the same.

Figure 14:
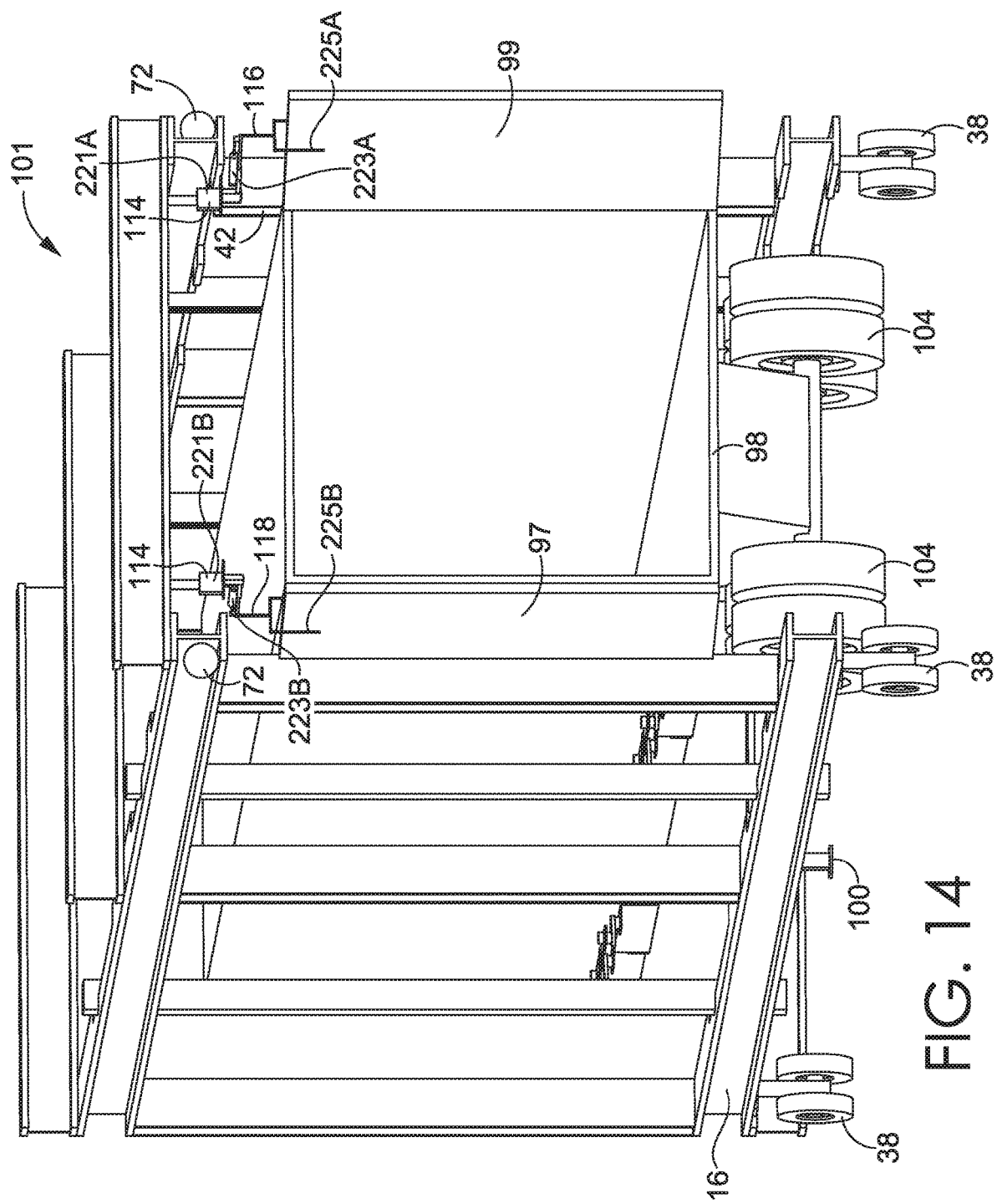
FIG. 14 depicts a partial, rear perspective view of a frame as described herein with securing components mounted on the frame for engaging doors of a trailer, in accordance with an embodiment hereof.

Referring now to FIG. 14, a partial, rear, perspective view of a mobile apparatus 101 having a retaining mechanism 114 used for moving and/or retaining a position of doors 97, 99 located on a wheeled cargo trailer 98 is provided, in accordance with an embodiment hereof. The mobile apparatus 101 shown in FIG. 14 includes wheels 38 and a frame 16, and may be moved into position around the trailer 98 after which various lift assemblies (e.g., the lift assemblies 44, 46 shown in FIG. 2A) may be used to lift the trailer 98. Once suspended, the trailer 98 may then be transported to a desired location, such as a dock 110 as shown in FIG. 6B, as described herein.

The retaining mechanism 114 is located proximate to an end 42 of the frame 16. The retaining mechanism 114 includes a first-side retaining element 116 and a second-side retaining element 118 that each extend from the frame 16. The first-side and second-side retaining elements 116, 118 are movably coupled to the frame 16 such that they are movable to different positions. The first-side and second-side retaining elements 116, 118 may be securable or lockable in such positions.

Further, in the example depicted in FIG. 14, the first-side retaining element 116 is coupled to a rotational actuator 221A that is adapted to impart rotational movement to the first-side retaining element 116, and is also coupled to a linear actuator 223A that is adapted to impart linear movement to the first-side retaining element 116. These rotational and linear actuators 221A, 223A are presented for example purposes and may or may not be incorporated, or may be incorporated differently (e.g., they may be incorporated at least partially into portions of the frame 16 such that they are obscured). The first-side retaining element 116 further includes a securing component 225A coupled thereto that is configured and positioned for engaging with, and securing, a door 99 located on the trailer 98.

The second-side retaining element 118 is also coupled to a rotational actuator 221B that is adapted to impart rotational movement to the second-side retaining element 118, and is also coupled to a linear actuator 223B that is adapted to impart linear movement to the second-side retaining element 118. These rotational and linear actuators 221B, 223B are presented for example purposes and may or may not be incorporated, or may be incorporated differently as described herein. The second-side retaining element 118 further includes a securing component 225B coupled thereto that is configured and positioned for engaging with, and securing, a door 97 located on the trailer 98.

The actuators 221A, 223A and 221B, 223B shown in FIG. 14 may be used to move the first-side and second-side retaining elements 116, 118 to different extended and/or rotated positions. The attaching of the securing components 225A, 225B to the doors 97, 99 allows movement imparted to the first-side and second-side retaining elements 116, 118 to be imparted to the doors 97, 99, and also allows the first-side and second-side retaining elements 116, 118 to be restricted from moving when desired. It should be noted that the actuators 221A, 223A and 221B, 223B are included and described for example purposes, and in alternative embodiments, these actuators may not be used, or only one may be used, or different actuators may be used. For example, in one embodiment, only the rotational actuators 221A, 221B may be incorporated, and in another embodiment, the movement of the first-side and second-side retaining elements 116, 118 may be manually enabled and controlled. The actuators 221A, 223A and 221B, 223B may be coupled to a control system that is operable to control the actuators and by association the movement of the first-side and second side retaining elements 116, 118.

The retaining elements 116, 118 and actuators coupled thereto may be used to engage and move, or hold in place, the doors 97, 99 of the trailer 98. For example, a control system may adjust the position of the retaining elements 116, 118 so that the securing components 225A, 225B are positioned to be coupled to the doors 97, 99. The doors 97, 99, once coupled with the securing components 225A, 225B, may then be moved to a desired position/orientation through operation of the actuators. The doors 97, 99 may also simply be held in position by the retaining elements 116, 118, such as, for example, when the trailer 98 is moved towards a loading dock with the doors 97, 99 in an open position.

The movement and/or positioning of the retaining elements 116, 118 and the operation of any actuators coupled thereto may also be guided and/or monitored using a vision system as described herein. For example, the vision system may be used to monitor the location of the doors 97, 99 and/or the location of the retaining elements 116, 118 coupled thereto. In this sense, the doors 97, 99 may be monitored by the vision system as an extended structure of the mobile apparatus 101 so that, during movement of the mobile apparatus 101 and the trailer 98, the doors 97, 99 do not collide with surrounding objects. The vision system may also be used to determine where the doors 97, 99 should be positioned.

Figure 15:
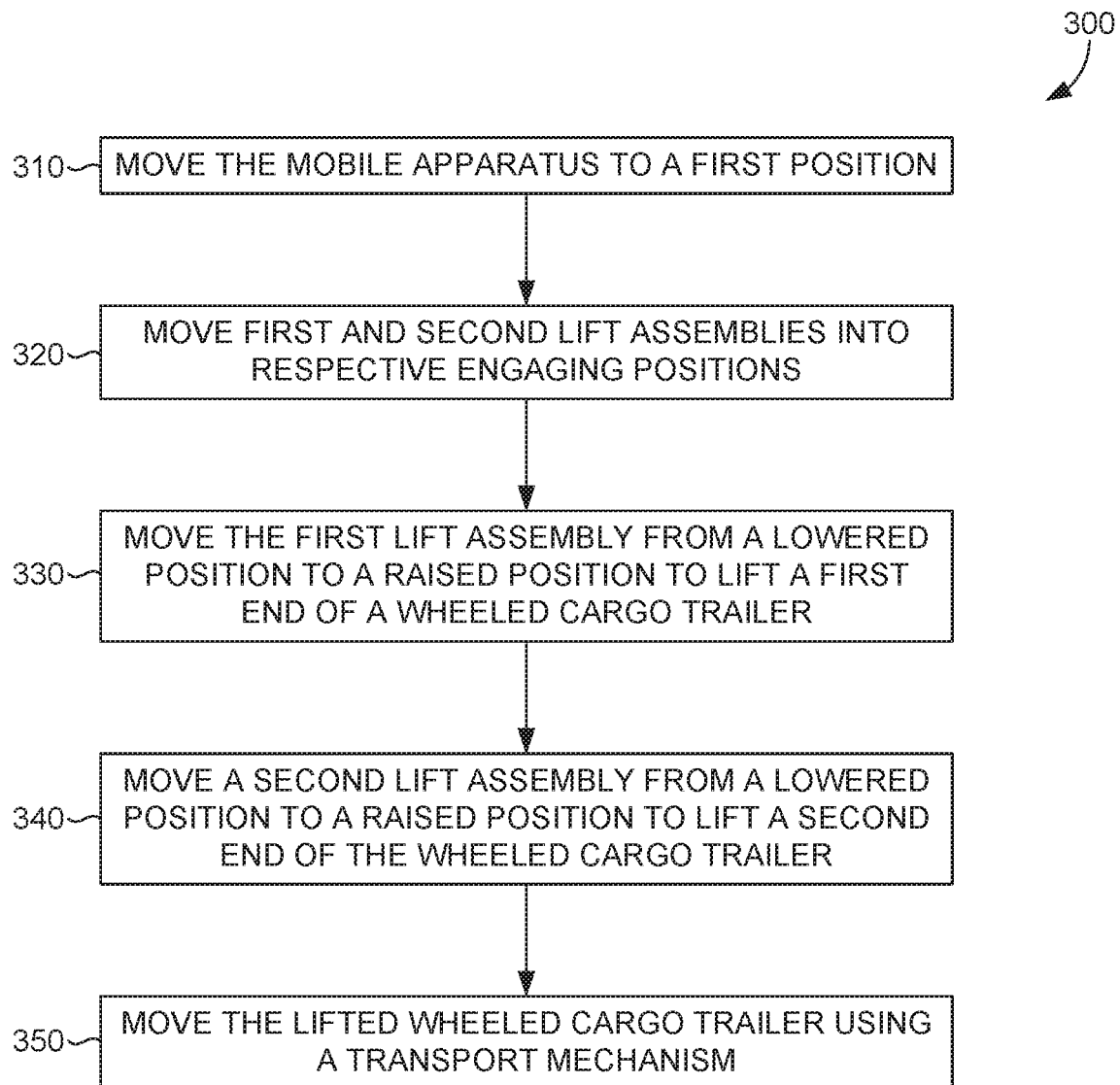
FIG. 15 depicts a block diagram of an example process for engaging, lifting, and moving an object, such as a wheeled cargo trailer, in accordance with an embodiment hereof.

Referring to FIG. 15, a block diagram of an exemplary process 300 for engaging, lifting, and moving an object using a mobile apparatus is provided, in accordance with an embodiment hereof. At block 310, a mobile apparatus, such as the mobile apparatus 10 shown in FIG. 2A, is moved into a first position, such as the position shown in FIG. 4B. The mobile apparatus may comprise a transport mechanism, such as the transport mechanism 12 shown in FIG. 2A, and a frame, such as the frame 16 shown in FIG. 2A, comprising a base portion, such as the base portion 22 shown in FIG. 2A, coupled to the transport mechanism. The mobile apparatus may further include a first elongated portion, such as the elongated portion 24 shown in FIG. 2A, extending from the base portion, and a second elongated portion, such as the elongated portion 26 shown in FIG. 2A, extending from the base portion. The elongated portions may be spaced from each other. The mobile apparatus may further include a first lift assembly, such as the lift assembly 44 shown in FIG. 2A, movably coupled to the frame, and a second lift assembly, such as the lift assembly 46 shown in FIG. 2A, coupled to the frame. The first position may comprise a position in which the frame at least partially surrounds the wheeled cargo trailer as shown, for example, in FIG. 4B.

At block 320, the first and second lift assemblies are moved into engaging positions. For example, a lift assembly, such as the lift assembly 46, may include lifting components, such as the lifting components 58, 64 shown in FIG. 2A, which may be similar to the lifting component 120 depicted and described with respect to FIGS. 7A-7B, that are moved from a retracted position to an extended position. For example, as shown in FIGS. 7A-7B and 8A-8B, a lifting portion 122 may be moved into an extended position through pivotal or linear actuation. A lifting component, such as the lifting component 50 shown in FIG. 2A, may also move into an engaging position through actuated movement along the frame, such as, for example, by moving the lifting component 50 of the lift assembly 44 using the actuator 56 shown in FIG. 2A. In this sense, an engaging position may comprise an adjusted position of the lifting component, such as one of the lifting components 50, 58, 64 shown in FIG. 2A, that is suitable for contacting and lifting an object enclosed by the frame. The movement of the lifting components into the engaging positions may occur in any of the x, y, and z directions relative to the frame, as shown in FIGS. 2A and 3, depending on the enabled movement of the lifting components and the actuators coupled to the frame. This multi-axis movement may be facilitated using different types of actuators, such as the linear and/or rotational actuators described herein.

At block 330, the first lift assembly is moved from a lowered position to a raised position to lift a first end of the wheeled cargo trailer. For example, the lifting component 50 may be elevated using the actuator 51 shown in FIG. 2A to lift the first end. At block 340, the second lift assembly is moved from a lowered position to a raised position to lift a second end of the wheeled cargo trailer. For example, the lifting components 58, 64 shown in FIG. 2A may be elevated using the linear actuators 136 shown in FIG. 9A to lift the end of the trailer. Operations described at blocks 330 and 340 may be performed simultaneously or in any sequence. At block 350, the lifted wheeled cargo trailer is moved using the transport mechanism.

Example Pneumatic Braking Systems and Adapters Therefor

In a further embodiment, a pneumatically-operated braking system for a wheeled cargo trailer is provided. The system includes a set of pneumatically-operated brakes that are coupled to a set of wheels of the wheeled cargo trailer, a glad hands connector coupled to the wheeled cargo trailer and pneumatically coupled to the set of pneumatically-operated brakes, and an adapter coupled to the wheeled cargo trailer and operable to provide a pneumatic connection with the pneumatically-operated braking system. The glad hands connector has a first pair of pneumatic couplings. A pair of pneumatic conduits extend between the set of pneumatically-operated brakes and the glad hands connector. The adapter also includes a second pair of pneumatic couplings adapted to be attached to a pneumatic source and a third pair of pneumatic couplings adapted to be attached to the first pair of pneumatic couplings of the glad hands connector to provide a pneumatic connection between the adapter and the glad hands connector. The system further includes a pair of pneumatic conduits that are releasably attachable to the first pair of pneumatic couplings of the glad hands connector and to the third pair of pneumatic couplings of the adapter.

The adapter may be pneumatically coupled to the pair of pneumatic conduits such that it is located between the glad hands connector and the set of pneumatically-operated brakes. The adapter may further include an interlock, the interlock being adjustable between a first configuration and a second configuration, the first configuration providing a pneumatic connection between the adapter and the set of brakes and the second configuration providing a pneumatic connection between the glad hands connector and the set of brakes. The interlock may include one or more movable components that block the pneumatic connection to the glad hands connector when the interlock is in the first configuration and block the pneumatic connection to the adapter when the interlock is in the second configuration. The adapter further includes a power/control coupling and a wireless communication component adapted to receive wireless signals and control, based on the received wireless signals, one or more electronic components of the wheeled cargo trailer.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C."

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations of elements, as well as use of elements not shown, are also possible and contemplated.

What is claimed is:

1. A mobile apparatus for engaging and moving objects, comprising:
   a frame, comprising:
      a base portion,
      a first elongated portion extending from the base portion, and
      a second elongated portion extending from the base portion, the second elongated portion spaced from the first elongated portion,
      wherein the first elongated portion and the second elongated portion extend from the base portion along a first axis which is perpendicular to a second axis;
   a first lift assembly coupled to the frame and comprising:
      a first lifting component,
      a first actuator coupled to the first lifting component, the first actuator operable to shift the first lifting component along the first axis to different positions along a length of the frame, and
      a second actuator coupled to the first lifting component and operable to shift the first lifting component along the second axis between a raised position and a lowered position;
   a second lift assembly coupled to the frame and comprising:
      a second lifting component,
      a third actuator coupled to the first elongated portion and coupled to the second lifting component and operable to shift the second lifting component along the second axis between a raised position and a lowered position while the first elongated portion remains extending along the first axis,
      a third lifting component, and
      a fourth actuator coupled to the second elongated portion and coupled to the third lifting component and operable to shift the third lifting component along the second axis between a raised position and a lowered position while the second elongated portion remains extending along the first axis,
      wherein the second lifting component and the third lifting component are each movable between an extended position and a retracted position, and
      wherein, in the extended position, the second lifting component and the third lifting component extend further towards each other than in the retracted position; and
   a transport mechanism coupled to the frame and operable to move the frame in at least one direction.

2. The mobile apparatus of claim 1, wherein the frame further comprises:
   a third elongated portion coupled to the base portion and spaced from the first elongated portion; and
   a fourth elongated portion coupled to the base portion and spaced from the second elongated portion,
   wherein the first lift assembly is movably coupled to a track extending along the third and fourth elongated portions.

3. The mobile apparatus of claim 1, wherein the first actuator comprises a linear actuator that utilizes a hydraulic piston or a screw-drive, and wherein the first lifting component comprises a fifth wheel adapted to engage a kingpin mounted on a wheeled cargo trailer.

4. The mobile apparatus of claim 1, further comprising a plurality of wheels, each of the wheels coupled to the frame or to the transport mechanism with a respective wheel attachment, wherein at least some of the plurality of wheels are steerable.

5. The mobile apparatus of claim 1, further comprising a vision system, the vision system comprising a plurality of detectors positioned about the mobile apparatus that are communicatively connected to one or more computer processors, the vision system adapted to determine at least one of a position and an identity of objects located about the mobile apparatus.

6. The mobile apparatus of claim 5, wherein the plurality of detectors comprise a plurality of cameras that record images of the objects located about the mobile apparatus, and wherein the vision system is configured to identify characters visible on the objects through an optical character recognition process performed on the images.

7. The mobile apparatus of claim 5, further comprising a wireless communication system configured to communicate information provided by the vision system to a computing device separate from the mobile apparatus.

8. The mobile apparatus of claim 1, wherein the second lifting component is elongated and is pivotally coupled to the first elongated portion of the frame, and wherein the third lifting component is elongated and is pivotally coupled to the second elongated portion of the frame, such that the second lifting component and the third lifting component are each pivotal between the extended position and the retracted position.

9. The mobile apparatus of claim 1, wherein the second lifting component is movably coupled to the first elongated portion with one or more linear actuators operable to move the second lifting component between the extended position and the retracted position, and wherein the third lifting component is movably coupled to the second elongated portion with one or more linear actuators operable to move the third lifting component between the extended position and the retracted position.

10. The mobile apparatus of claim 1, wherein the second lifting component is movably coupled to the first elongated portion such that it is movable to different positions along a length of the first elongated portion that extends along the first axis, and wherein the third lifting component is movably coupled to the second elongated portion such that it is movable to different positions along a length of the second elongated portion that extends along the first axis.

* * * * *